United States Patent
Furuta

(10) Patent No.: US 11,579,817 B2
(45) Date of Patent: Feb. 14, 2023

(54) PRINTING SYSTEM, TERMINAL DEVICE, PLURAL PRINTING APPARATUSES, COMPRISING A SECOND PRINTING APPARATUS THAT TRANSMITS A DATA FORMAT OF PRINT JOB TO THE TERMINAL DEVICE VIA A FIRST PRINTING APPARATUS, AND THE TERMINAL DEVICE FURTHER GENERATES PRINT JOB FOR EACH DETERMINED DATA FORMATS FOR THE FIRST PRINTER

(71) Applicant: SEIKO EPSON CORPORATION, Tokyo (JP)

(72) Inventor: Yasuhiro Furuta, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/318,257

(22) Filed: May 12, 2021

(65) Prior Publication Data

US 2021/0357162 A1 Nov. 18, 2021

(30) Foreign Application Priority Data

May 15, 2020 (JP) .............................. JP2020-085712

(51) Int. Cl.
*G06F 3/12* (2006.01)

(52) U.S. Cl.
CPC .......... *G06F 3/1206* (2013.01); *G06F 3/1205* (2013.01); *G06F 3/1222* (2013.01); *G06F 3/1232* (2013.01); *G06F 3/1238* (2013.01); *G06F 3/1254* (2013.01); *G06F 3/1255* (2013.01); *G06F 3/1267* (2013.01)

(58) Field of Classification Search
None
See application file for complete search history.

(56) References Cited

U.S. PATENT DOCUMENTS

| | | | |
|---|---|---|---|
| 9,729,735 B2 * | 8/2017 | Zehler | ................ H04N 1/00204 |
| 2002/0131065 A1 * | 9/2002 | Sweetland | ........... H04N 1/2353 |
| | | | 358/1.15 |
| 2010/0110465 A1 * | 5/2010 | Ferlitsch | ............... G06F 3/1285 |
| | | | 358/1.15 |

(Continued)

FOREIGN PATENT DOCUMENTS

JP 2016-111461 6/2016

*Primary Examiner* — Haris Sabah
(74) *Attorney, Agent, or Firm* — Workman Nydegger

(57) ABSTRACT

In a printing system, a terminal device generates a plurality of pieces of print job data based on a data format list and transmit the generated print job data to a first multifunction machine, the first multifunction machine stores a plurality of pieces of received print job data, and performs printing based on print job data having the data format supported by the first multifunction machine itself when the first multifunction machine itself receives a print instruction from a user, and the second multifunction machine receives print job data having the data format supported by the second multifunction machine itself from the first multifunction machine when the second multifunction machine itself receives a print instruction from a user and performs printing based on the received print job data.

9 Claims, 12 Drawing Sheets

(56) References Cited

U.S. PATENT DOCUMENTS

| | | | |
|---|---|---|---|
| 2011/0242569 A1* | 10/2011 | Ohara | G06F 3/1247 |
| | | | 358/1.13 |
| 2012/0147422 A1* | 6/2012 | Honma | G06F 3/1285 |
| | | | 358/1.15 |
| 2014/0300931 A1* | 10/2014 | Honma | G06F 3/1228 |
| | | | 358/1.15 |
| 2015/0153984 A1* | 6/2015 | Furushige | G06F 3/1261 |
| | | | 358/1.15 |
| 2017/0192727 A1* | 7/2017 | Yun | G06F 3/1261 |

* cited by examiner

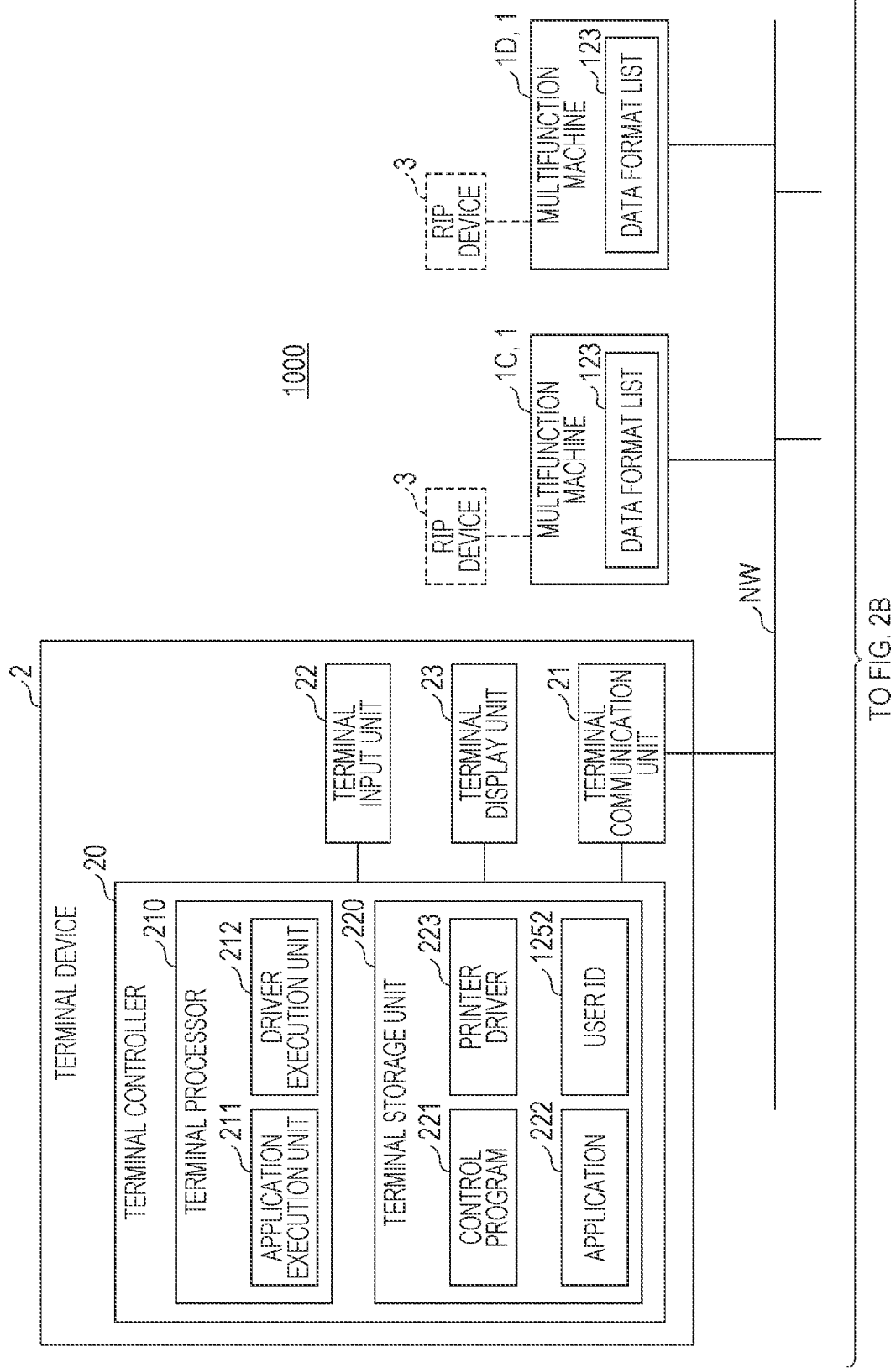

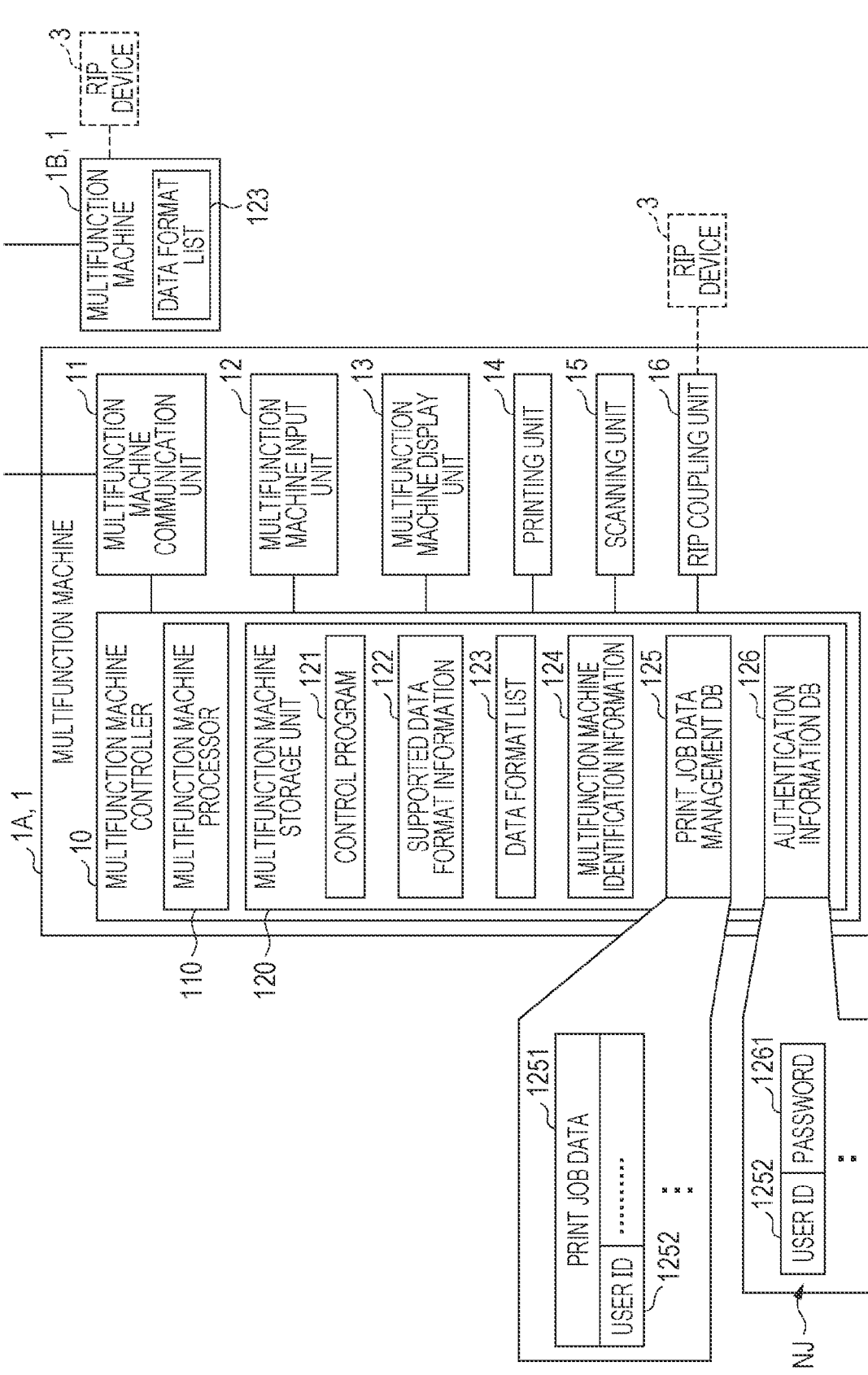

| | MULTIFUNCTION MACHINE (F1) | DATA FORMAT (F2) |
|---|---|---|
| R1 | MULTIFUNCTION MACHINE 1A | PWG-Raster: PORTRAIT FORMAT |
| | | JPEG: PORTRAIT FORMAT |
| | | VENDOR ORIGINAL |
| R2 | MULTIFUNCTION MACHINE 1B | PWG-Raster: PORTRAIT FORMAT |
| | | PWG-Raster: LANDSCAPE FORMAT |
| | | JPEG: PORTRAIT FORMAT |
| R3 | MULTIFUNCTION MACHINE 1C | PWG-Raster: PORTRAIT FORMAT |
| | | PWG-Raster: LANDSCAPE FORMAT |
| | | PDF |
| | | PS |
| R4 | MULTIFUNCTION MACHINE 1D | PDF |
| | | PS |

FIG. 10

| MULTIFUNCTION MACHINE | PRIORITY | DATA FORMAT |
|---|---|---|
| MULTIFUNCTION MACHINE 1A | 1 | VENDOR ORIGINAL |
| | 2 | PWG-Raster: PORTRAIT FORMAT |
| | 2 | JPEG: PORTRAIT FORMAT |
| MULTIFUNCTION MACHINE 1B | 1 | PWG-Raster: PORTRAIT FORMAT |
| | 1 | JPEG: PORTRAIT FORMAT |
| | 2 | PWG-Raster: LANDSCAPE FORMAT |
| MULTIFUNCTION MACHINE 1C | 1 | PWG-Raster: PORTRAIT FORMAT |
| | 2 | PWG-Raster: LANDSCAPE FORMAT |
| | 3 | PDF |
| | 3 | PS |
| MULTIFUNCTION MACHINE 1D | 1 | PDF |
| | 1 | PS |

| MULTIFUNCTION MACHINE | PRIORITY | DATA FORMAT |
|---|---|---|
| MULTIFUNCTION MACHINE 1A | 1 | VENDOR ORIGINAL |
|  | 2 | PWG-Raster; PORTRAIT FORMAT |
|  | 2 | JPEG; PORTRAIT FORMAT |
| MULTIFUNCTION MACHINE 1B | 1 | PWG-Raster; PORTRAIT FORMAT |
|  | 1 | JPEG; PORTRAIT FORMAT |
|  | 2 | PWG-Raster; LANDSCAPE FORMAT |
| MULTIFUNCTION MACHINE 1C | 1 | PWG-Raster; PORTRAIT FORMAT |
|  | 2 | PWG-Raster; LANDSCAPE FORMAT |
|  | 3 | PDF |
|  | 3 | PS |
| MULTIFUNCTION MACHINE 1D | 1 | PDF |
|  | 1 | PS |

⇩

J12

| MULTIFUNCTION MACHINE | PRIORITY | DATA FORMAT |
|---|---|---|
| MULTIFUNCTION MACHINE 1A | 2 | PWG-Raster; PORTRAIT FORMAT |
|  | 2 | JPEG; PORTRAIT FORMAT |
| MULTIFUNCTION MACHINE 1B | 1 | PWG-Raster; PORTRAIT FORMAT |
|  | 1 | JPEG; PORTRAIT FORMAT |
|  | 2 | PWG-Raster; LANDSCAPE FORMAT |
| MULTIFUNCTION MACHINE 1C | 1 | PWG-Raster; PORTRAIT FORMAT |
|  | 2 | PWG-Raster; LANDSCAPE FORMAT |
|  | 3 | PDF |
|  | 3 | PS |
| MULTIFUNCTION MACHINE 1D | 1 | PDF |
|  | 1 | PS |

⇩

J13

| MULTIFUNCTION MACHINE | PRIORITY | DATA FORMAT |
|---|---|---|
| MULTIFUNCTION MACHINE 1A | 2 | PWG-Raster; PORTRAIT FORMAT |
|  | 2 | JPEG; PORTRAIT FORMAT |
| MULTIFUNCTION MACHINE 1B | 1 | PWG-Raster; PORTRAIT FORMAT |
|  | 1 | JPEG; PORTRAIT FORMAT |
| MULTIFUNCTION MACHINE 1C | 1 | PWG-Raster; PORTRAIT FORMAT |
| MULTIFUNCTION MACHINE 1D | 1 | PDF |
|  | 1 | PS |

PRINTING SYSTEM, TERMINAL DEVICE, PLURAL PRINTING APPARATUSES, COMPRISING A SECOND PRINTING APPARATUS THAT TRANSMITS A DATA FORMAT OF PRINT JOB TO THE TERMINAL DEVICE VIA A FIRST PRINTING APPARATUS, AND THE TERMINAL DEVICE FURTHER GENERATES PRINT JOB FOR EACH DETERMINED DATA FORMATS FOR THE FIRST PRINTER

The present application is based on, and claims priority from JP Application Serial Number 2020-085712, filed May 15, 2020, the disclosure of which is hereby incorporated by reference herein in its entirety.

BACKGROUND

1. Technical Field

The present disclosure relates to a printing system, a printing apparatus, and a terminal device.

2. Related Art

In the related art, in a printing system including a plurality of printing apparatuses, a technique is known in which a user can perform printing with any printing apparatus. For example, JP-A-2016-111461 discloses a technique in which in a printing system including a plurality of printing apparatuses, when one printing apparatus holds print job data transmitted from the information processing apparatus and another printing apparatus different from the one printing apparatus performs printing, a printing process is performed by acquiring the print job data from the one printing apparatus.

However, JP-A-2016-111461 does not consider the case where data formats, of the print job data, supported by a plurality of printing apparatuses are different between the plurality of printing apparatuses, so that even when one printing apparatus acquires print job data from another printing apparatus, the one printing apparatus may not performs printing.

SUMMARY

According to an aspect of the present disclosure, a printing system includes a plurality of printing apparatuses and a terminal device configured to communicate with the plurality of printing apparatuses, wherein a second printing apparatus other than a first printing apparatus of the plurality of printing apparatuses transmits a data format, of print job data, that is supported by the second printing apparatus itself to the first printing apparatus, wherein the first printing apparatus generates a data format list including the received data format supported by the second printing apparatus and the data format supported by the first printing apparatus itself to transmit the generated data format list to the terminal device, wherein the terminal device determines a plurality of the data formats of the print job data to be generated based on the received data format list to generate the print job data for each of the plurality of determined data formats to transmit the plurality of generated print job data to the first printing apparatus, the first printing apparatus receives the plurality of print job data from the terminal device to store the plurality of received print job data to perform printing based on the print job data having the data format supported by the first printing apparatus when the first printing apparatus receives a print instruction from a user, and wherein the second printing apparatus receives the print job data having the data format supported by the second printing apparatus from the first printing apparatus when the second printing apparatus receives a print instruction from a user to perform printing based on the received print job data.

According to another aspect of the present disclosure, a printing method performed by a plurality of printing apparatuses and a terminal device configured to communicate with the plurality of printing apparatuses, wherein a second printing apparatus other than a first printing apparatus of the plurality of printing apparatuses transmits a data format, of print job data, that is supported by the second printing apparatus itself to the first printing apparatus, wherein the first printing apparatus generates a data format list including the received data format supported by the second printing apparatus and the data format supported by the first printing apparatus itself to transmit the generated data format list to the terminal device, wherein the terminal device determines a plurality of the data formats of the print job data to be generated based on the received data format list to generate the print job data for each of the plurality of determined data formats to transmit the plurality of generated print job data to the first printing apparatus, the first printing apparatus receives the plurality of print job data from the terminal device to store the plurality of received print job data to perform printing based on the print job data having the data format supported by the first printing apparatus when the first printing apparatus receives a print instruction from a user, and wherein the second printing apparatus receives the print job data having the data format supported by the second printing apparatus from the first printing apparatus when the second printing apparatus receives a print instruction from a user to perform printing based on the received print job data.

According to still another aspect of the present disclosure, a printing apparatus includes a printing apparatus communication unit configured to communicate with a terminal device and another printing apparatus, a storage unit, and a printing apparatus controller, wherein the printing apparatus controller receives a data format of print job data supported by the another printing apparatus through the printing apparatus communication unit from the another printing apparatus, generates a data format list including the received data format supported by the another printing apparatus and the data format supported by the printing apparatus to transmit the generated data format list to the terminal device through the printing apparatus communication unit, receives a plurality of pieces of the print job data generated based on the data format list from the terminal device through the printing apparatus communication unit, stores the plurality of pieces of received print job data in the storage unit, performs printing based on the print job data having the data format supported by the printing apparatus when the printing apparatus receives a print instruction from a user, and transmits the print job data having the data format supported by the another printing apparatus to the another printing apparatus when the another printing apparatus receives a print instruction from a user.

According to still another aspect of the present disclosure, a terminal device includes a terminal communication unit that communicates with a first printing apparatus that stores received print job data, and a second printing apparatus that is configured to receive the print job data stored by the first printing apparatus from the first printing apparatus, and a terminal controller, wherein the terminal controller receives a data format list including a data format, of the print job data, supported by the first printing apparatus and the data format supported by the second printing apparatus through the terminal communication unit from the first printing apparatus, and determines a plurality of the data formats of the print job data to be generated based on the received data format list to generate the print job data for each of the plurality of determined data formats to transmit the plurality of generated print job data to the first printing apparatus through the terminal communication unit.

BRIEF DESCRIPTION OF THE DRAWINGS

FIGS. 2A and 2B are a block diagram showing a functional configuration of a multifunction machine and a terminal device.

FIG. 3 is a diagram showing an example of a data format list.

FIG. 10 is a diagram showing an example of a data format list.

FIG. 11 is a diagram for explaining a preprocess.

DESCRIPTION OF EXEMPLARY EMBODIMENTS

First Embodiment

Figure 1:
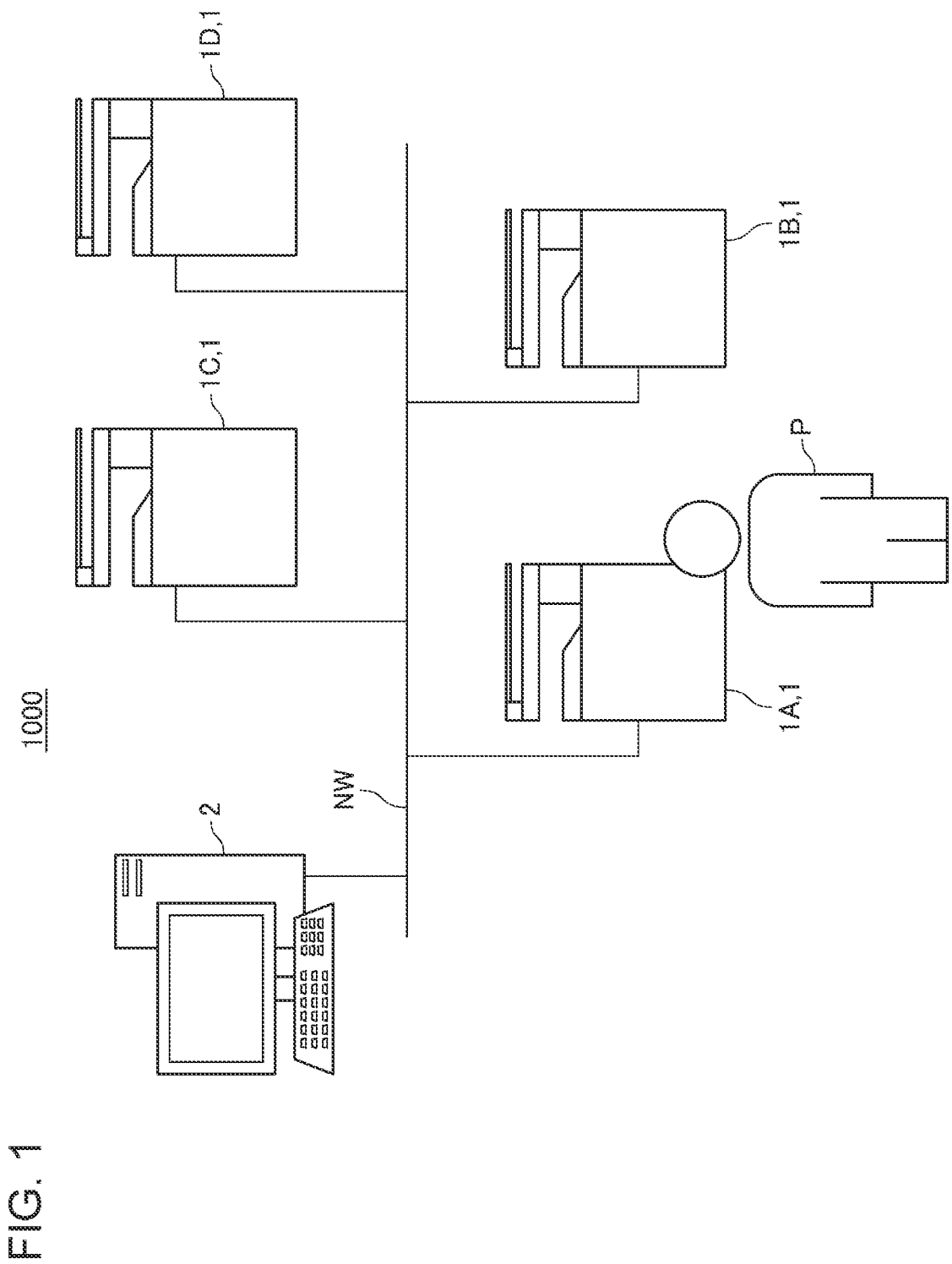
FIG. 1 is a diagram showing a configuration of a printing system.

FIG. 1 is a diagram showing a configuration of a printing system 1000. As shown in FIG. 1, the printing system 1000 includes four multifunction machines 1, that is, multifunction machines 1A, 1B, 1C, and 1D, and a terminal device 2. The multifunction machine 1 corresponds to an example of a printing apparatus.

As shown in FIG. 1, in the printing system 1000, the four multifunction machines 1 and the terminal device 2 are connected to a network NW. The network NW may be a network constructed by a virtual line such as a virtual private network (VPN), or may be a network constructed by a physical line. The network NW may be a network constructed by including one or a plurality of intermediate network devices.

The printing system 1000 has an authentication printing function. The authentication printing means that the multifunction machine 1 receives an operation related to the user authentication from a user P, the multifunction machine 1 performs the user authentication based on the received operation related to the user authentication, and when the user authentication has succeeded, the multifunction machine 1 that has performed the user authentication produces printed matter based on a print job desired by the user. As a result, in the printing system 1000, it is possible to prevent the multifunction machine 1 installed at a location remote from the user P from generating the printed matter based on the print job desired by the user P, and information printed on the printed matter from leaking to another person.

Note that one print job refers to a series of operations for producing one or a plurality of printed matter by printing. In the case of producing a plurality of sheets of printed matter, the one print job refers to a series of operations for producing printed matter having the same printed content. For example, when producing ten sheets of the printed matter having the same content, the one print job refers to a series of operations for producing ten sheets of the printed matter. In the following description, the data for executing the print job is referred to as "print job data" and is represented by the reference numeral "1251".

The multifunction machine 1 is referred to as a multi function peripheral (MFP) and is a device capable of performing various processes such as printing and scanning. The multifunction machine 1 performs various processes based on the print job data 1251 received from the terminal device 2, and performs various processes based on the operation by the user P on the input section such as the operation switch and the touch panel provided in the multifunction machine 1.

When the multifunction machine 1 receives the print job data 1251 generated by the terminal device 2 from the terminal device 2, the multifunction machine 1 stores the received print job data 1251 in a multifunction machine storage unit 120 described later. When the multifunction machine 1 receives an operation related to the user authentication, the multifunction machine 1 performs the user authentication based on the received operation related to the user authentication. When the user authentication is successful, the multifunction machine 1 performs printing based on the print job data 1251 of the user P stored in another multifunction machine 1. Alternatively, when the user authentication is successful, the multifunction machine 1 performs printing based on the print job data 1251 of the user P stored by the multifunction machine 1 itself.

The terminal device 2 is a personal computer (PC). In FIG. 1, the type of the terminal device 2 exemplifies a desktop type, but it may be a laptop type or a tablet type. The terminal device 2 generates the print job data 1251 to transmit the generated print job data 1251 to the multifunction machine 1.

In the present embodiment, although the case where the printing system 1000 includes one terminal device 2 is illustrated, the number of terminal devices 2 included in the printing system 1000 is not limited to one, but may be plural. Further, the number of the multifunction machines 1 included in the printing system 1000 is not limited to four, and may be further increased, or may be reduced as long as it is two or more.

FIGS. 2A and 2B are a block diagram showing a functional configuration of the multifunction machine 1 and the terminal device 2.

First, the multifunction machine 1 will be described. The multifunction machine 1 includes a multifunction machine controller 10, a multifunction machine communication unit 11, a multifunction machine input unit 12, a multifunction machine display unit 13, a printing unit 14, a scanning unit 15, and a raster image processor (RIP) device coupling unit 16. The multifunction machine controller 10 corresponds to an example of a printing apparatus controller. Further, the multifunction machine communication unit 11 corresponds to an example of a printing apparatus communication unit.

The multifunction machine controller 10 includes a multifunction machine processor 110 that is a processor, such as a CPU and an MPU, that executes programs, and the multifunction machine storage unit 120, and controls respective units of the multifunction machine 1. The multifunction machine storage unit 120 corresponds to an example of a storage unit. The multifunction machine controller 10 performs various processes in cooperation with hardware and software so that the multifunction machine processor 110 reads a control program 121 stored in the multifunction machine storage unit 120 and executes the process.

The multifunction machine storage unit 120 has a storage area in which a program to be executed by the multifunction machine processor 110 and data processed by the multifunction machine processor 110 are stored. The multifunction machine storage unit 120 stores the control program 121 executed by the multifunction machine processor 110, supported data format information 122, a data format list 123, multifunction machine identification information 124, a print job data management DB 125, an authentication information DB 126, and various other pieces of data. The multifunction machine storage unit 120 has a non-volatile storage area in which programs and data are stored in a nonvolatile manner. Further, the multifunction machine storage unit 120 may include a volatile storage area, and may constitute a work area in which a program to be executed by the multifunction machine processor 110 and data to be processed are temporarily stored.

The supported data format information 122 is information indicating one or a plurality of data formats, of the stored print job data 1251, supported by the multifunction machine 1. In the embodiment, the one multifunction machine 1 supports one or a plurality of data formats of six data formats, that is, a portable document format (PDF), a postscript (PS), a PWG-Raster in portrait format, a PWG-Raster in landscape format, a JPEG in portrait format, and a vendor original. The PWG-Raster in portrait format is a PWG-Raster format data format in which raster images are disposed in portrait format. The PWG-Raster in landscape format is a PWG-Raster format data format in which raster images are disposed in landscape format. The JPEG in portrait format is a JPEG data format in which raster images are disposed in portrait format. The vendor original refers to a data format uniquely defined by the vendor of the multifunction machine 1. The data formats indicated by the supported data format information are not limited to the above six, and may include different types of data formats, or may be further reduced. That is, the data formats that the one multifunction machine 1 can support are not limited to the above six, and may include different types of data formats, or may be further reduced.

The data format list 123 is information indicating, in a list format, the data formats supported by all the multifunction machines 1 included in the printing system 1000. FIG. 3 is a diagram showing an example of the data format list 123.

One record in the data format list 123 has a multifunction machine field F1 and a data format field F2.

The multifunction machine field F1 stores the multifunction machine identification information 124 for identifying the multifunction machine 1 in the printing system 1000. Examples of the multifunction machine identification information 124 include information indicating the name of the multifunction machine 1, information indicating the address of the multifunction machine 1 in the network NW, the serial number of the multifunction machine 1, and the like. The data format field F2 stores information indicating the data format supported by the corresponding multifunction machine 1 indicated by the multifunction machine field F1 in the same record.

In FIG. 3, a record R1 shows a record related to a multifunction machine 1A. The multifunction machine identification information 124 indicating the multifunction machine 1A is stored in the multifunction machine field F1 of the record R1. Further, information indicating three types of data formats, that is the PWG-Raster in portrait format, the JPEG in portrait format, and the vendor original as the data formats supported by the multifunction machine 1A is stored in the data format field F2 of the record R1.

In FIG. 3, a record R2 shows a record related to a multifunction machine 1B. The multifunction machine identification information 124 indicating the multifunction machine 1B is stored in the multifunction machine field F1 of the record R2. Further, information indicating three types of data formats, that is, the PWG-Raster in portrait format, the PWG-Raster in landscape format, and the JPEG in portrait format, is stored as the data formats supported by the multifunction machine 1B in the data format field F2 of the record R2.

In FIG. 3, a record R3 shows a record related to a multifunction machine 1C. The multifunction machine identification information 124 indicating the multifunction machine 1C is stored in the multifunction machine field F1 of the record R3. Further, information indicating four types of data formats, that is, the PWG-Raster in portrait format, the PWG-Raster in landscape format, the PDF, and the PS, are stored as the data formats supported by the multifunction machine 1C in the data format field F2 of the record R3.

In FIG. 3, a record R4 shows a record related to a multifunction machine 1D. The multifunction machine identification information 124 indicating the multifunction machine 1D is stored in the multifunction machine field F1 of the record R4. Further, information indicating two types of data formats, that is, the PDF and the PS, are stored as the data formats supported by the multifunction machine 1D in the data format field F2 of the record R4.

Returning to the description of FIGS. 2A and 2B, the print job data management DB 125 is a database that stores the print job data 1251.

The authentication information DB 126 is a database that stores authentication information NJ as a record. One record stored in the authentication information DB 126 has one combination of a user ID 1252 and a password 1261. The user ID 1252 corresponds to an example of user information.

The user ID 1252 is identification information for identifying the user P in authentication printing. The user ID 1252 is allocated to each user P in advance.

The multifunction machine communication unit 11 includes communication hardware according to a predetermined communication standard, and communicates with another multifunction machine 1 and the terminal device 2 according to a predetermined communication standard under the control of the multifunction machine controller 10.

The multifunction machine input unit 12 includes an input section such as an operation switch and a touch panel provided in the multifunction machine 1, detects an operation by the user P on the input section, and outputs the operation to the multifunction machine controller 10. The multifunction machine controller 10 performs a process corresponding to an operation on the input section based on the input from the multifunction machine input unit 12. The multifunction machine input unit 12 includes the input section when the user P inputs the authentication information NJ to the multifunction machine 1. An example of the input section includes a card reader that reads an IC card or the like that stores the authentication information NJ of the user P. The method of inputting the user P is not limited to this example. For example, the user P may enter the combination of the user ID 1252 and the password 1261 as the authentication information NJ into the operation switch or the touch panel, or may input the authentication information NJ by fingerprint authentication. In the present embodiment, the combination of the user ID 1252 and the password 1261 is illustrated as the authentication information NJ, but the authentication information NJ is not limited to this, and may be, for example, information indicating a fingerprint in the case of fingerprint authentication.

The multifunction machine display unit 13 includes a plurality of LEDs and a display panel, and turns on/off/blinks the LEDs in a predetermined mode, displays information on the display panel, and the like under the control of the multifunction machine controller 10.

The printing unit 14 has a configuration related to a printing system including an ink jet head that forms dots by ejecting ink on a print medium, a carriage for operating the ink jet head in the scanning direction, a carriage drive motor for driving the carriage, a transport unit for transporting a print medium, an ink supply unit for supplying ink to the ink jet head, and the like. The printing unit 14 performs printing on the print medium by forming dots on the printing surface of the print medium to which ink is ejected from the nozzle of the ink jet head, and that is transported under the control of the multifunction machine controller 10.

The scanning unit 15 includes a configuration related to scanning by a scanner or the like that reads characters and images recorded on a document. For example, the scanning unit 15 irradiates the document with light emitted by a light source to read the recorded characters and images to output the image data acquired by the reading to the multifunction machine controller 10. The multifunction machine controller 10 performs data processing such as RGB conversion and compression processing on the image data input from the scanning unit 15 to generate data in a predetermined format. Then, the multifunction machine controller 10 stores the generated data in a predetermined format in the multifunction machine storage unit 120.

The RIP device coupling unit 16 includes a mechanism for coupling of a RIP device 3 that dedicatedly executes image processing. The RIP device 3 corresponds to an example of an image processing device. When the RIP device 3 is coupled, the RIP device coupling unit 16 acquires, from the RIP device 3, information indicating a data format that the RIP device 3 can support. Then, the RIP device coupling unit 16 outputs, to the multifunction machine controller 10, information indicating that the RIP device 3 is coupled and information indicating a data format that the RIP device 3 can support. When the RIP device 3 is coupled to the multifunction machine 1, the data format that can be supported changes, for example, the data format, of the compatible print job data 1251, that can be supported increases.

Next, the terminal device 2 will be described. The terminal device 2 includes a terminal controller 20, a terminal communication unit 21, a terminal input unit 22, and a terminal display unit 23.

The terminal controller 20 includes a terminal processor 210 that is a processor, such as a CPU and an MPU, that executes programs, and a terminal storage unit 220, and controls respective units of the terminal device 2. The terminal controller 20 performs various processes in cooperation with hardware and software so that the terminal processor 210 reads a control program 221 stored in the terminal storage unit 220 to execute the processes. Further, the terminal controller 20 functions as an application execution unit 211 by the terminal processor 210 executing an application 222 stored in the terminal storage unit 220. Further, the terminal controller 20 functions as a driver execution unit 212 by the terminal processor 210 executing a printer driver 223 stored in the terminal storage unit 220.

The terminal storage unit 220 has a storage area in which a program to be executed by the terminal processor 210 and data processed by the terminal processor 210 are stored. The terminal storage unit 220 stores the control program 221 executed by the terminal processor 210, the application 222, the printer driver 223, the user ID 1252, and various other pieces of data. The terminal storage unit 220 has a nonvolatile storage area in which programs and data are stored in a nonvolatile manner. Further, the terminal storage unit 220 may include a volatile storage area, and may constitute a work area in which a program to be executed by the terminal processor 210 and data to be processed are temporarily stored.

The terminal communication unit 21 includes communication hardware according to a predetermined communication standard, and communicates with the multifunction machine 1 under the control of the terminal controller 20.

The terminal input unit 22 includes an operation switch provided on the terminal device 2 and an input section such as a touch panel, a mouse, a keyboard, and the like, detect an operation by the user P on the input section, and outputs the detection result to the terminal controller 20. The terminal controller 20 performs a process corresponding to an operation on the input section based on an input from the terminal input unit 22.

The terminal display unit 23 includes an LED, a display panel, and the like, and turns on/off/blinks the LEDs in a predetermined mode, displays information on the display panel, and the like under the control of the terminal controller 20.

Next, the operation of the printing system 1000 will be described through the description of the application execution unit 211 and the driver execution unit 212.

First, the operation of the multifunction machine 1 related to the update of the data format list 123 will be described. The update of the data format list 123 corresponds to an example of a generation of the data format list 123.

Figure 4:
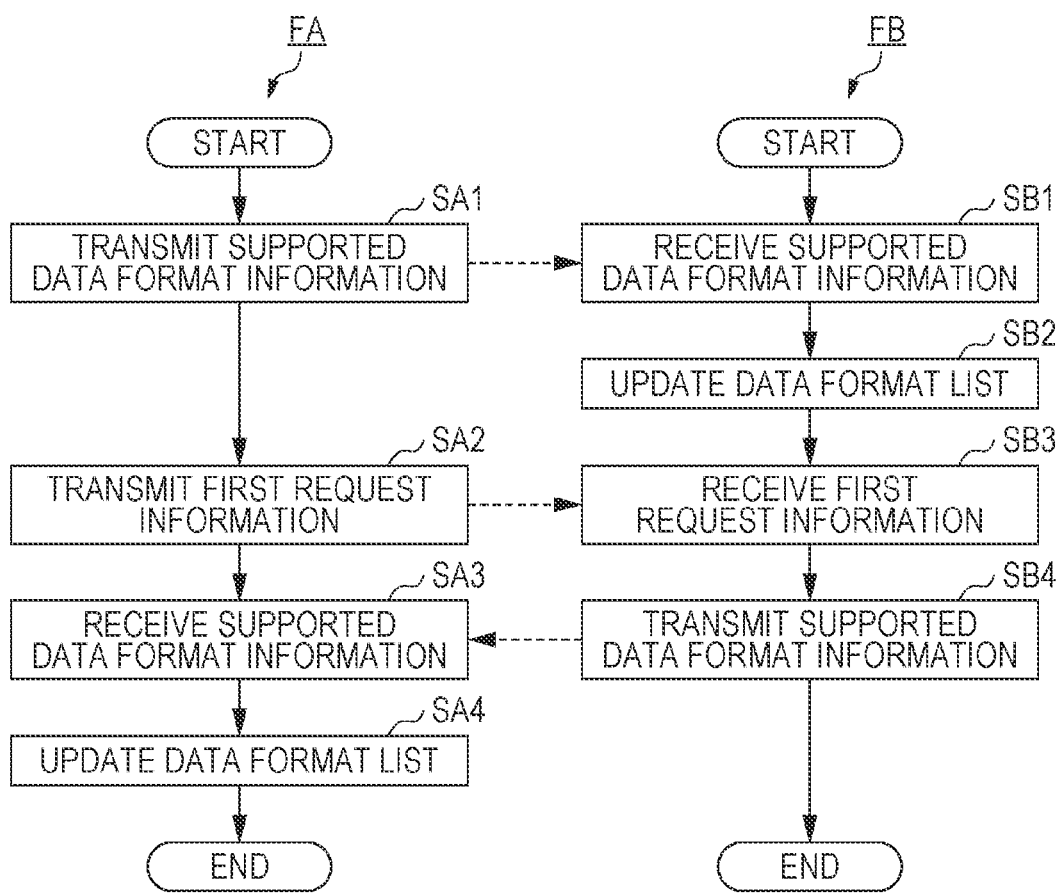
FIG. 4 is a flowchart showing the operation of the multifunction machine.

FIG. 4 is a flowchart showing the operation of the printing system 1000. FIG. 4 shows the operation of the plurality of multifunction machines 1 in the printing system 1000. In FIG. 4, a flowchart FA shows the operation of the multifunction machine 1 in which the start trigger of the operation related to the update of the data format list 123 has occurred, and a flowchart FB shows the operation of a multifunction machine 1 other than the multifunction machine 1 concerned.

In the description of FIG. 4, the multifunction machine 1A is taken as an example of the former multifunction machine 1, and the multifunction machines 1B, 1C, and 1D are taken as an example of the latter multifunction machine 1.

When the start trigger is generated, the multifunction machine controller 10 of the multifunction machine 1A transmits the supported data format information 122 stored in the multifunction machine storage unit 120 of the multifunction machine 1A to the multifunction machines 1B, 1C, and 1D through the multifunction machine communication unit 11 (step SA1). In step SA1, the multifunction machine controller 10 of the multifunction machine 1A transmits, to the multifunction machines 1B, 1C, and 1D, the supported data format information 122 in association with the multifunction machine identification information 124 of the multifunction machine 1A.

Examples of the start trigger include an event in which the power is turned on to the multifunction machine 1A, and an event in which the RIP device 3 is coupled to the multifunction machine 1A.

In a case where the RIP device 3 is coupled when performing the process of step SA1, the supported data format information 122 to be transmitted in step SA1 includes information indicating the data format that the RIP device 3 enables the multifunction machine 1A to be able to support is also included.

When the multifunction machine controller 10 of each of the multifunction machines 1B, 1C, and 1D receives the supported data format information 122 through the multifunction machine communication unit 11 (step SB1), the multifunction machine controller 10 updates the data format list 123 that the multifunction machine storage unit 120 of the multifunction machine controller 10 stores based on the received supported data format information 122 (step SB2).

In step SB2 the multifunction machine controller 10 of each of the multifunction machines 1B, 1C, and 1D updates the data format field F2 of the record R1 in the data format list 123 to the data format indicated by the supported data format information 122 received from the multifunction machine 1A.

When the multifunction machine controller 10 of the multifunction machine 1A transmits the supported data format information 122 to the multifunction machines 1B, 1C, and 1D, the multifunction machine controller 10 transmits the first request information requesting the supported data format information 122 to the multifunction machines 1B, 1C, and 1D through the multifunction machine communication unit 11 (step SA2).

When the multifunction machine controller 10 of each of the multifunction machines 1B, 1C, and 1D receives the first request information through the multifunction machine communication unit 11 (step SB3), the multifunction machine controller 10 transmits, to the multifunction machine 1A, the supported data format information 122 stored in the multifunction machine storage unit 120 (step SB4).

When the multifunction machine controller 10 of the multifunction machine 1A receives the supported data format information 122 from each of the multifunction machines 1B, 1C, and 1D, the multifunction machine controller 10 updates the data format list 123 based on the received supported data format information 122 (step SA4).

That is, the multifunction machine controller 10 of the multifunction machine 1A updates the data format fields F2 of the records R2, R3, and R4 in the data format list 123 to the data format indicated by the supported data format information 122 received from each of the multifunction machines 1B, 1C, and 1D.

In the description of FIG. 4, the multifunction machine 1A is taken as an example of the multifunction machine 1 in which the start trigger is generated. When the start trigger is generated, each of the multifunction machines 1B, 1C, and 1D performs the same operation as the multifunction machine 1A as described in FIG. 4.

In addition, a case where the RIP device 3 is coupled as the start trigger is taken as an example. The start trigger may be generated when the RIP software is installed on its own multifunction machine 1 instead of or together with the RIP device 3 being coupled. The RIP software corresponds to an example of image processing software. When the start trigger includes the RIP software being installed, the multifunction machine 1 may not include the RIP device coupling unit 16 as a functional unit.

As described above, when the start trigger is generated in one multifunction machine 1, all the multifunction machines 1 included in the printing system 100 update the data format list 123. Therefore, every time the start trigger is generated in one multifunction machine 1, the data format list 123 stored in each multifunction machine 1 is updated with accurate information.

Next, the operation of the printing system 1000 related to the authentication printing will be described. In the description of the operation of the printing system 1000 related to the authentication printing, the operation related to the storage of the print job data 1251 by the multifunction machine 1 and the operation related to the printing based on the print job data 1251 by the multifunction machine 1 will be described separately.

First, the operation related to the storage of the print job data 1251 by the multifunction machine 1 will be described.

Figure 5:
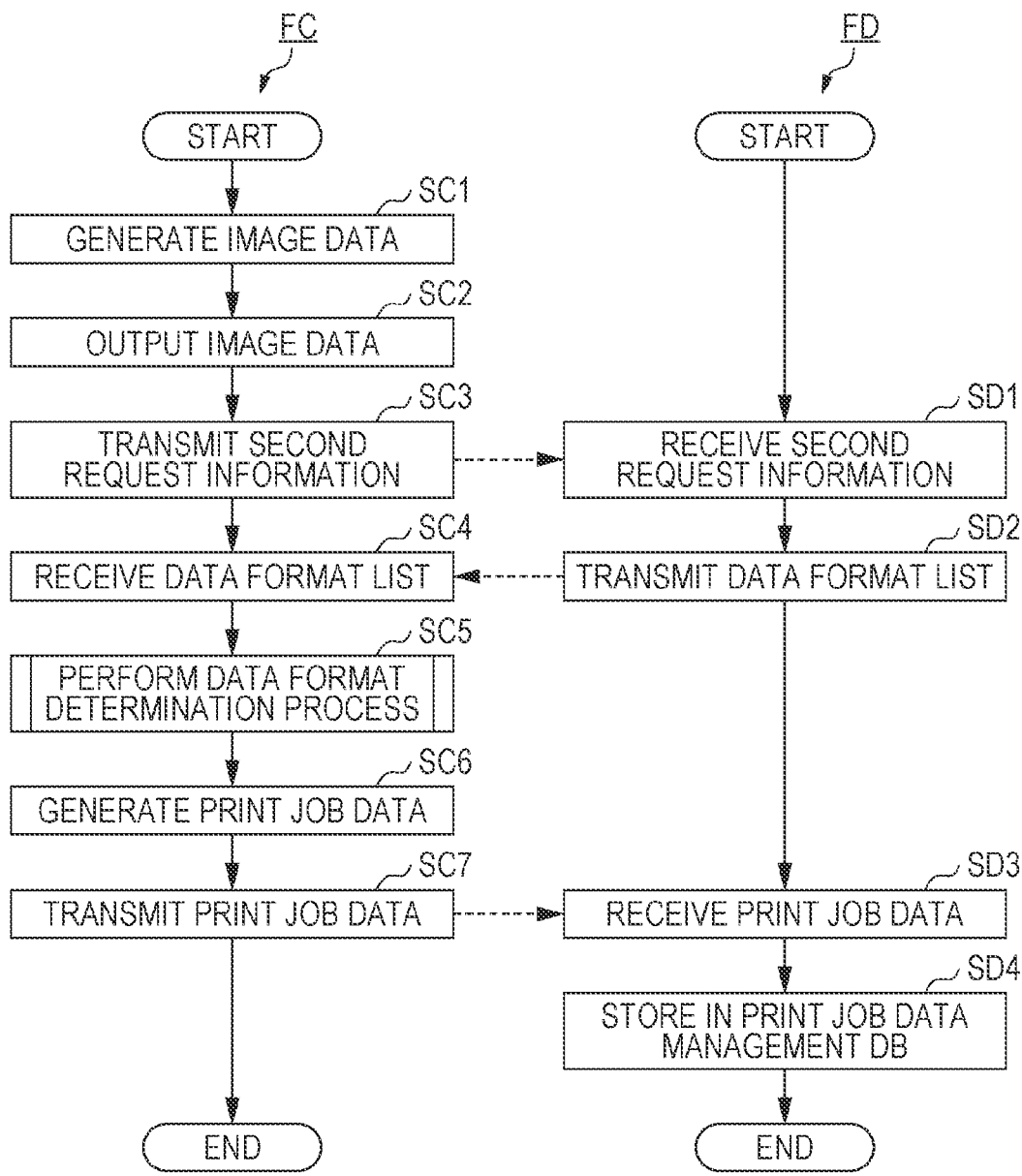
FIG. 5 is a flowchart showing the operation of the printing system.

FIG. 5 is a flowchart showing the operation of the printing system 1000. A flowchart FC shows the operation of the terminal device 2, and a flowchart FD shows the operation of one multifunction machine 1.

In the description of FIG. 5, the multifunction machine 1A is taken as an example of the multifunction machine 1 that performs the operation of the flowchart FD.

The application execution unit 211 of the terminal controller 20 generates image data of the image printed by the multifunction machine 1 in the authentication printing based on the operation by the user P on the terminal device 2 (step SC1).

Next, the application execution unit 211 outputs the generated image data to the driver execution unit 212 (step SC2).

The driver execution unit 212 transmits the second request information requesting the data format list 123 to the multifunction machine 1A through the terminal communication unit 21 (step SC3).

As shown in the flowchart FD, when the multifunction machine controller 10 of the multifunction machine 1A receives the second request information through the multifunction machine communication unit 11 (step SD1), the multifunction machine controller 10 transmits the data format list 123 stored in the multifunction machine storage unit 120 to the terminal device 2 (step SD2).

As shown in the flowchart FC, when the driver execution unit 212 receives the data format list 123 through the terminal communication unit 21 (step SC4), the driver execution unit 212 performs a data format determination process (step SC5).

The data format determination process is a process of determining the data format of the print job data 1251 to be generated from the received data format list 123.

Figure 6:
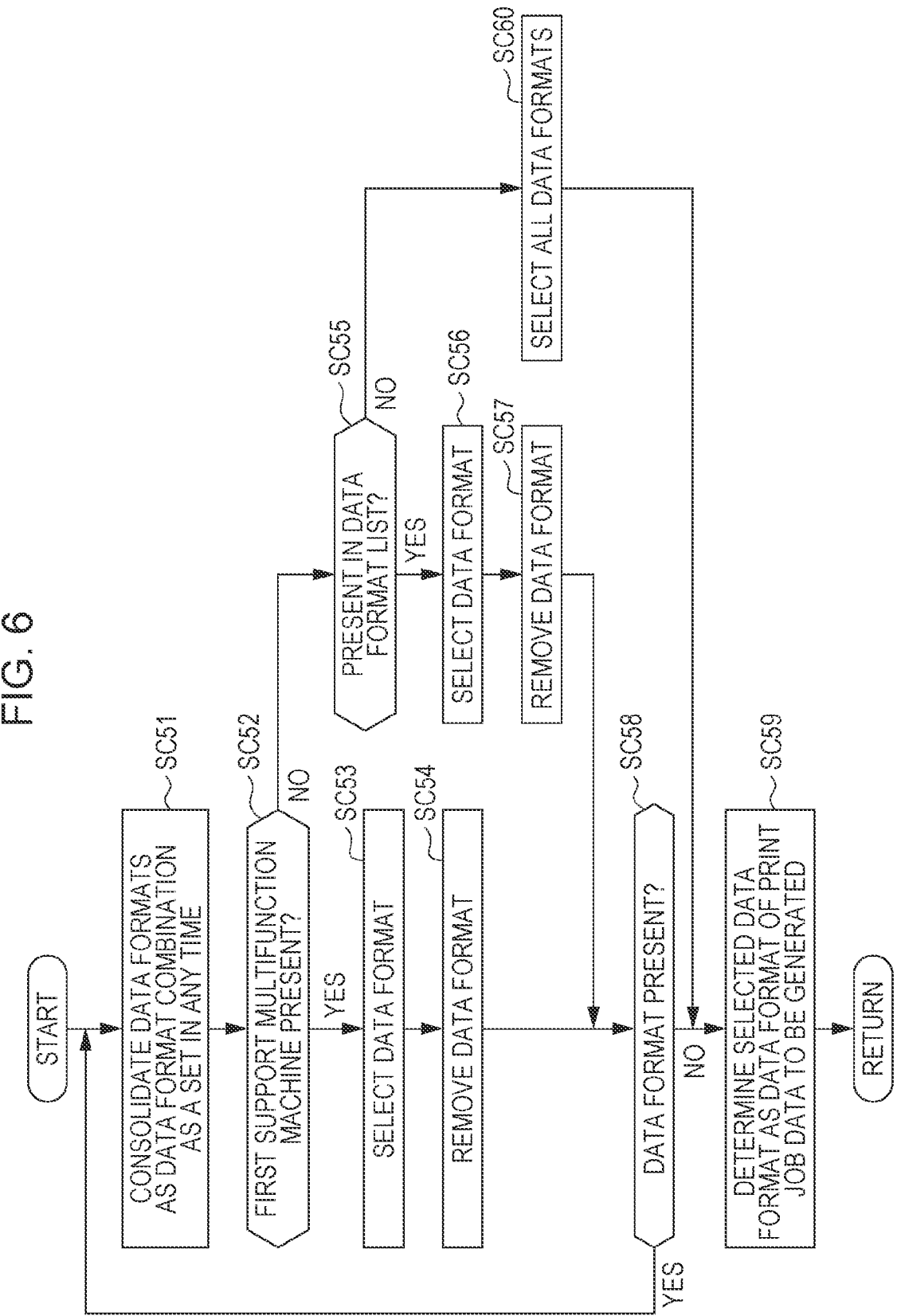
FIG. 6 is a flowchart showing the operation of a driver execution unit.

FIG. 6 is a flowchart showing the operation of the driver execution unit 212 in the data format determination process.

The driver execution unit 212 consolidates data formats as a combination of data formats that the multifunction machines 1A to 1D in the printing system 1000 support as a set in any time (step SC51). Here, to consolidate means to perform a process on the data format list 123 so that the combination of data formats can be handled or regarded as one object in the data format list 123.

In the following description, a combination of data formats that the multifunction machines 1A to 1D supports as a set in any time, that is, a combination of a plurality of data formats that each of all the multifunction machines 1 (1A to 1D) supports is referred to as a "combination data format". The combination data format is predetermined.

Next, the driver execution unit 212 refers to the data format list 123 to determine whether the multifunction machine 1 that supports only one combination data format or one data format is present among the multifunction machines 1A, 1B, 1C, and 1D (step SC52).

In the following description, the multifunction machine 1 that supports only one combination data format or only one data format is referred to as a "first support multifunction machine", and a multifunction machine that supports a data format supported by the first support multifunction machine and a data format other than the data format supported by the first support multifunction machine is referred to as a "second support multifunction machine".

When the driver execution unit 212 determines that the first support multifunction machine is present (YES in step SC52), the driver execution unit 212 selects the data format from the data format list 123 (step SC53).

Here, the process of step SC53 will be described in detail. In step SC53, when the first support multifunction machine is the multifunction machine 1 that supports only one combination data format, the driver execution unit 212 selects, from the data format list 123, any one data format of the plurality of data formats included in this one combination data format. Further, in step SC53, when the first support multifunction machine is the multifunction machine 1 that supports only one data format, the driver execution unit 212 selects the one data format from the data format list 123.

Next, when the driver execution unit 212 selects the data format in step SC3, the driver execution unit 212 removes the data format supported by the first support multifunction machine and the second support multifunction machine from the data format list 123 (step SC54).

Returning to the explanation of step SC52, when it is determined that the first support multifunction machine is not present (NO in step SC52), the driver execution unit 212 determines whether at least one of the most common data format and the most common combination data format is present in the data format list 123 (step SC55). The most common data format is a data format that is commonly supported by the plurality of multifunction machines 1A to 1D and is supported by the largest number of multifunction machines 1. The most common combination data format is a combination data format that is commonly supported by the plurality of multifunction machines 1A to 1D and is supported by the largest number of multifunction machines 1.

When it is determined that at least one of the most common data format and the most common combination data format is present in the data format list 123 (YES in step SC55), the driver execution unit 212 selects the data format from the data format list 123 (step SC56).

Here, the process of step SC56 will be described in detail. In step SC56, the driver execution unit 212 selects the most common data format from the data format list 123 when the most common data format is present in the data format list 123. Further, in step SC56, when the most common combination data format is present in the data format list 123, the driver execution unit 212 selects, from the data format list 123, any one data format included in the most common combination data format.

When the driver execution unit 212 selects the data format in step SC56, the driver execution unit 212 removes, from the data format list 123, the data format supported by the multifunction machine 1 that supports the data format selected in step SC56 (step SC57).

When the processes of step SC54 and step SC57 are performed, the driver execution unit 212 determines whether the data format supported by the multifunction machine 1 is present in the data format list 123 (step SC58).

When it is determined that the data format is present in the data format list 123 (YES in step SC58), the driver execution unit 212 returns the process to step SC51 and performs the processes of step SC51 and its subsequent steps again.

On the other hand, when it is determined that the data format is not present in the data format list 123 (NO in step SC58), the driver execution unit 212 determines the data format selected from the data format list 123 in step S53 or S56 as the data format of the print job data 1251 to be generated (step SC59).

Returning to the explanation of step SC55, when it is determined that at least one of the most common data format and the most common combination data format is not present in the data format list 123 (NO in step SC55), the driver execution unit 212 selects all types of data formats from the data format list 123 (step SC60).

Then, the driver execution unit 212 determines the data format selected from the data format list 123 as the data format of the print job data 1251 to be generated (step SC59).

Figure 7:
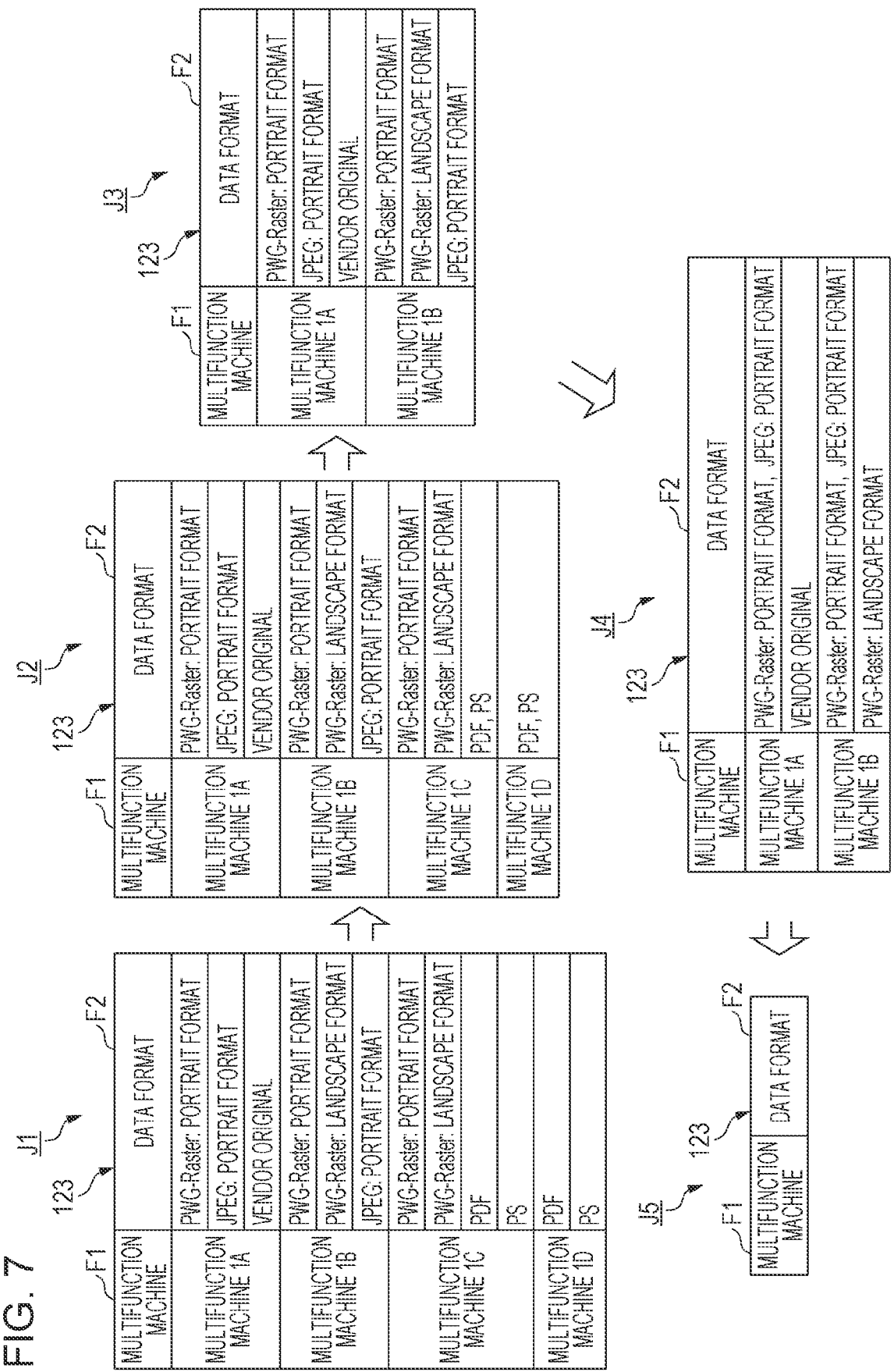
FIG. 7 is a diagram for specifically explaining a data format determination process.

Here, the operation of FIG. 6 will be specifically described with reference to FIG. 7. FIG. 7 is a diagram for specifically explaining the data format determination process.

In FIG. 7, a state J1 shows the state of the data format list 123 when the terminal device 2 receives it in step SC4. The data format list 123 in the state J1 shown in FIG. 7 is the same as the data format list 123 in FIG. 3.

The driver execution unit 212 consolidates data formats as a combination data format with respect to the data format list 123 in the state J1. In FIG. 7, the combination of the PDF and the PS is the combination data format. The driver execution unit 212 changes the state of the data format list 123 from the state J1 to a state J2 by consolidating and handling the PDF data format and the PS data format together as one combination data format with respect to the data format list 123 in the state J1.

Here, as is clear from the data format list 123 in the state J2 in FIG. 7, the multifunction machine 1D supports only the combination data format of the PDF and the PS. That is, the multifunction machine 1D is the first support multifunction machine. Therefore, the driver execution unit 212 makes an affirmative determination in step SC52 of FIG. 6 and selects any one data format of the PDF and the PS from the data format list 123. Hereinafter, in the description of FIG. 7, it is assumed that the driver execution unit 212 selects the PDF.

As is clear from the data format list 123 in the state J2, the multifunction machine 1C supports the PWG-Raster in portrait format and the PWG-Raster in landscape format in addition to the combination data format of the PDF and the PS. That is, the multifunction machine 1C is the second support multifunction machine. Therefore, in step SC54 of FIG. 6, the driver execution unit 212 removes the list of data formats supported by the multifunction machine 1C and the multifunction machine 1D, and changes the state of the data format list 123 from the state J2 to a state J3.

As is clear from the data format list 123 in the state J3, the data format list 123 in the state J3 includes the list of data formats supported by the multifunction machines 1A and 1B. Therefore, the driver execution unit 212 makes an affirmative determination in step SC58, and performs the process of step SC51 and its subsequent steps on the data format list 123 in the state J3 again.

The driver execution unit 212 consolidates data formats as the combination data format with respect to the data format list 123 in the state J3. In FIG. 7, the combination of the PWG-Raster in portrait format and the JPEG in portrait format is the combination data format. The driver execution unit 212 changes the state of the data format list 123 from the state J3 to a state J4 by consolidating and handling the PWG-Raster in portrait format data format and the JPEG in portrait format data format together as one combination data format with respect to the data format list 123 in the state J3.

As is clear from the data format list 123 in the state J4, the first support multifunction machine is not present in the data format list 123 of the state J4. Therefore, the driver execution unit 212 makes a negative determination in step SC52, and determines whether at least one of the most common data format and the most common combination data format is present in the data format list 123. As is clear from the data format list 123 in the state J4, the combination data format corresponding to the PWG-Raster in portrait format and the JPEG in portrait format is the most common combination data format. Therefore, the driver execution unit 212 makes an affirmative determination in step SC55, and selects any one data format of the PWG-Raster in portrait format and the JPEG in portrait format from the data format list 123. Hereinafter, in the description of FIG. 7, it is assumed that the driver execution unit 212 selects the PWG-Raster in portrait format.

As is clear from the data format list 123 in the state J4, the multifunction machines 1A and 1B support the selected PWG-Raster in portrait format. Therefore, in step SC57 of FIG. 6, the driver execution unit 212 removes the data format supported by the multifunction machine 1A and the multifunction machine 1B, and changes the state of the data format list 123 from the state J4 to a state J5.

As is clear from the data format list 123 in the state J5, the data format list 123 in the state J5 does not include a list of data formats supported by any of the multifunction machines 1. Therefore, the driver execution unit 212 makes a negative determination in step SC58, and determines the PDF and the PWG-Raster in portrait format selected from the data format list 123 as the data formats of the print job data 1251 to be generated.

Returning to the description of FIG. 5, when the driver execution unit 212 performs the data format determination process, the driver execution unit 212 generates the print job data 1251 having the data format determined by the data format determination process (step SC6). The print job data 1251 includes the user ID 1252 stored in the terminal storage unit 220. For example, when the PDF and the PWG-Raster in portrait format are determined in the data format determination process, the driver execution unit 212 generates the print job data 1251 of the PDF and the print job data 1251 of the PWG-Raster in portrait format.

Next, when the driver execution unit 212 generates the print job data 1251, the driver execution unit 212 transmits the generated print job data 1251 to the multifunction machine 1A (step SC7).

As shown in the flowchart FD, when the multifunction machine controller 10 of the multifunction machine 1A receives the print job data 1251 through the multifunction machine communication unit 11 (step SD3), the multifunction machine controller 10 stores the received print job data 1251 in the print job data management DB (step SD4).

Although in the description of FIG. 5, the multifunction machine 1A is illustrated as the multifunction machine 1 that performs the operation of the flowchart FD, any of the multifunction machines 1B, 1C, and 1D may perform the operation of the flowchart FD depending on the multifunction machine 1 to which the terminal device 2 transmits the second request information.

Figure 8:
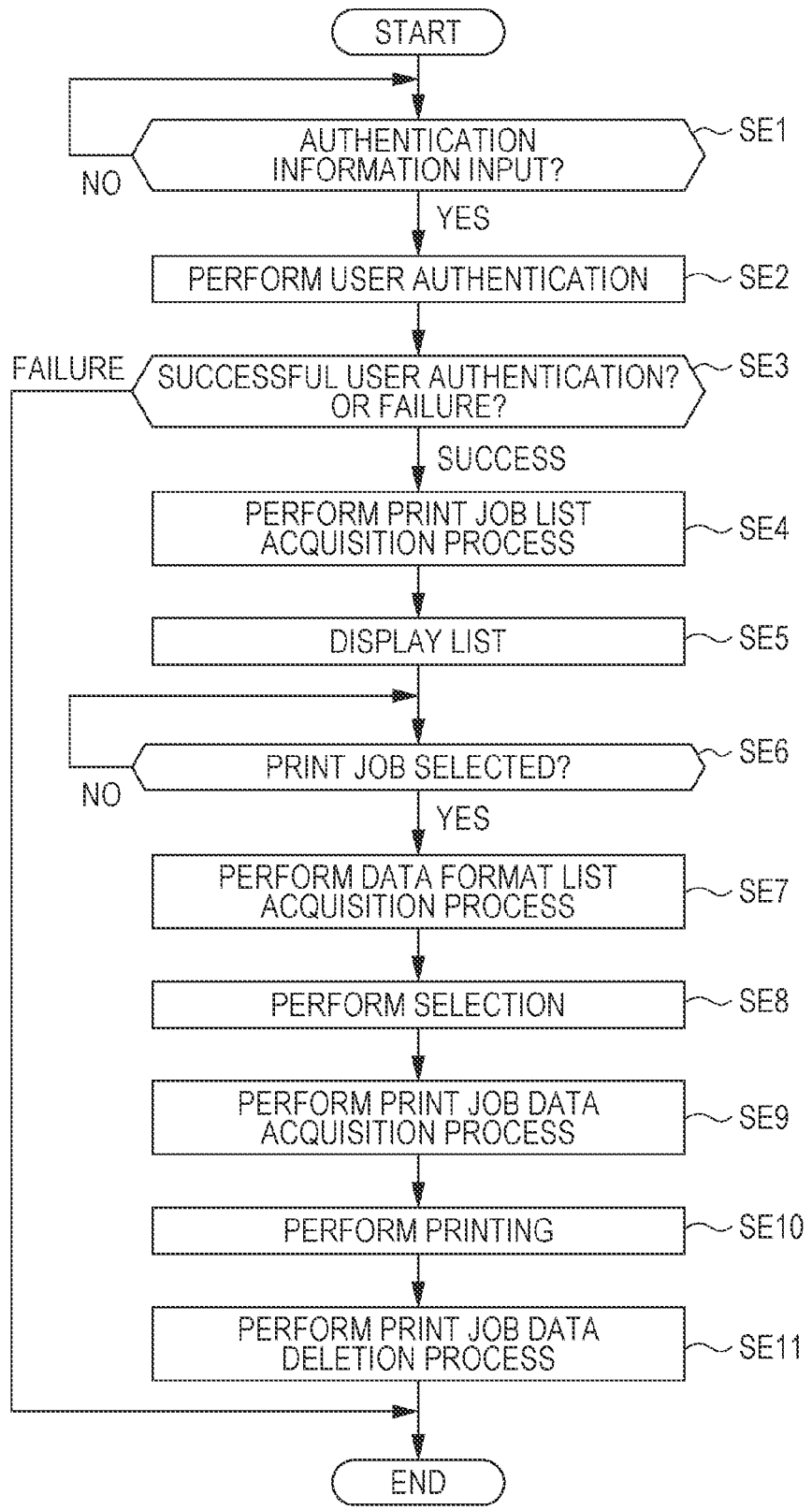
FIG. 8 is a flowchart showing the operation of the multifunction machine.

Next, the operation related to printing based on the print job data 1251 by the multifunction machine 1 will be described. FIG. 8 is a flowchart showing the operation of the multifunction machine 1.

The multifunction machine controller 10 of the multifunction machine 1 determines whether the authentication information NJ has been input by the multifunction machine input unit 12 (step SE1).

When the multifunction machine controller 10 determines that the authentication information NJ has been input (YES in step SE1), the multifunction machine controller 10 performs the user authentication based on the input authentication information NJ (step SE2).

The multifunction machine controller 10 determines whether the user authentication succeeds or fails (step SE3). The multifunction machine controller 10 refers to the authentication information DB 126 to determine whether the input authentication information NJ is stored in the authentication information DB 126 as one record. When it is determined that the input authentication information NJ is not stored, the multifunction machine controller 10 determines that the user authentication has failed, and when it is determined that the input authentication information NJ is stored, the multifunction machine controller 10 determines that the user authentication has succeeded.

When it is determined that the user authentication has failed ("failure" in step SE3), the multifunction machine controller 10 ends the process.

On the other hand, when it is determined that the user authentication has succeeded ("success" in step SE3), the multifunction machine controller 10 performs a print job list acquisition process (step SE4).

The print job list acquisition process is a process of acquiring the list information of the print job of the user P who has succeeded in the user authentication from all the multifunction machines 1 provided in the printing system 1000. An example of the list information of the print job includes list information such as the name of the print job.

In the print job list acquisition process, the multifunction machine controller 10 determines whether the print job data 1251 having the user ID 1252 whose user authentication has succeeded is stored in the print job data management DB 125. When it is determined that the print job data 1251 having the user ID 1252 whose user authentication has succeeded is stored in the print job data management DB 125, the multifunction machine controller 10 generates and acquires list information of the print job of the user P who has succeeded in the user authentication based on the print job data 1251.

In the print job list acquisition process, the multifunction machine controller 10 transmits, to another multifunction machine 1, third request information requesting the list information of the print job through the multifunction machine communication unit 11. The third request information includes a user ID whose user authentication has succeeded. When receiving the third request information, another multifunction machine 1 determines whether the print job data 1251 having the user ID 1252 included in the third request information is stored in the print job data management DB 125. When it is determined that the print job data 1251 having the user ID 1252 whose user authentication has succeeded is stored in the print job data management DB 125, another multifunction machine 1 generates list information of the print job of the user P who has succeeded in the user authentication based on the print job data 1251. Then, another multifunction machine 1 transmits list information of the generated print job as a response to the third request information. From the above, the multifunction machine controller 10 of the multifunction machine 1 that has transmitted the third request information acquires, from another multifunction machine 1, the list information of the print job of the user P who has succeeded in the user authentication.

When the multifunction machine controller 10 performs the print job list acquisition process, the multifunction machine display unit 13 displays the list information of the print job acquired in the print job list acquisition process (step SE5).

The multifunction machine controller 10 determines whether one print job is selected from the list of print jobs (step SE6).

When it is determined that the one print job is selected (step SE6), the multifunction machine controller 10 determines that the user P has received the print instruction based on the one print job and performs a data format list acquisition process (step SE7).

The data format list acquisition process is a process of acquiring list information of the data formats of the print job data 1251 for the print job selected by the user P from the multifunction machine 1 that stores the print job data 1251.

In the data format list acquisition process, the multifunction machine controller 10 refers, when the multifunction machine 1 having the multifunction machine controller 10 itself stores the print job data 1251 of the print job selected by the user P, to the print job data management DB 125 to identify all the data formats of the print job data 1251 having the user ID 1252 whose user authentication has succeeded. Then, the multifunction machine controller 10 generates and acquires the list information of the identified data formats.

In the data format list acquisition process, when another multifunction machine 1 stores the print job data 1251 of the print job selected by the user P, the multifunction machine controller 10 transmits fourth request information requesting the list information of the data formats. The fourth request information includes a user ID 1252 whose user authentication has succeeded. The another multifunction machine 1 identifies all the data formats of the print job data 1251 having the user ID 1252 whose user authentication has succeeded. Then, the another multifunction machine 1 generates the list information of the identified data formats to transmit the list information of the generated data formats as a response to the fourth request information. From the above, the multifunction machine controller 10 of the multifunction machine 1 that has transmitted the fourth request information acquires the list information of the data formats from the another multifunction machine 1.

When the multifunction machine controller 10 performs the data format list acquisition process, selects one data format from the data formats of the print job data 1251 selected by the user P based on the list information of the data formats acquired by the data format list acquisition process (step SE8). For example, in step SE8, the multifunction machine controller 10 selects one data format whose processing speed does not fall below a predetermined speed.

Next, when the multifunction machine controller 10 selects the one data format in step SE8, the multifunction machine controller 10 performs a print job data acquisition process (step SE9).

The print job data acquisition process is a process of acquiring, from the multifunction machine 1 that stores the print job data 1251, the print job data 1251, of the print job selected by the user P, that has the one data format selected in step SE8.

In the print job data acquisition process, the multifunction machine controller 10 acquires, when the multifunction machine 1 having the multifunction machine controller 10 itself stores the print job data 1251, of the print job selected by the user P, that has the one data format selected in step SE8, the print job data 1251 from the print job data management DB 125.

In the print job data acquisition process, the multifunction machine controller 10 transmits, when another multifunction machine 1 stores the print job data 1251, of the print job selected by the user P, that has the one data format selected in step SE8, a fifth request information requesting the print job data 1251 to the another multifunction machine 1. When receiving the fifth request information, the another multifunction machine 1 refers to the print job data management DB 125 to transmit the print job data 1251 requested by the fifth request information as a response to the fifth request information. From the above, the multifunction machine 1 that has transmitted the fifth request information acquires, from another multifunction machine 1, the print job data 1251, of the print job selected by the user P, that has the one data format selected in step SE8.

When the multifunction machine controller 10 performs the print job data acquisition process, the printing unit 14 performs printing based on the print job data 1251 acquired in the print job data acquisition process (step SE10).

Next, when printing is performed, the multifunction machine controller 10 performs a print job data deletion process (step SE11).

The print data deletion process is a process of deleting the print job data 1251 on which printing is performed from the print job data management DB.

The multifunction machine controller 10 deletes, when the multifunction machine 1 that has acquired the print job data 1251 in the print job data acquisition process is the multifunction machine 1 having the multifunction machine controller 10, the performed print job data 1251 and the print job data 1251 having a different data format from the performed print job data 1251 from the print job data management DB 125.

When the multifunction machine 1 that has acquired the print job data 1251 in the print job data acquisition process is another multifunction machine 1, the multifunction machine controller 10 transmits sixth request information to the another multifunction machine 1. The sixth request information is information requesting that the performed print job data 1251 and the print job data 1251 having a different data format from the performed print job data 1251 be deleted from the print job data management DB 125. When receiving the sixth request information, the another multifunction machine 1 deletes the print job data 1251 to be deleted in the sixth request information from the print job data management DB 125.

According to the above-described embodiment, the following effects are obtained. The first multifunction machine and the second multifunction machine used in the explanation of the following effects do not refer to the specific multifunction machine 1. The first multifunction machine refers to any one multifunction machine 1 of the multifunction machines 1A, 1B, 1C, and 1D, and the second multifunction machine refers to a multifunction machine 1 other than the any one multifunction machine 1. The first multifunction machine corresponds to an example of the first printing apparatus, and the second multifunction machine corresponds to an example of the second printing apparatus and another printing apparatus.

The printing system 1000 includes a plurality of multifunction machines 1 and the terminal device 2. The second multifunction machine transmits a data format, of the print job data 1251, that is supported by the second multifunction machine itself to the first multifunction machine. The first multifunction machine generates the data format list 123 including the received data format supported by the second multifunction machine and a data format supported by the first multifunction machine itself to transmit the generated data format list 123 to the terminal device 2. The terminal device 2 determine a plurality of data formats of the print job data 1251 to be generated based on the received data format list 123, generates the print job data 1251 for each of the determined data formats, and transmits the plurality of pieces of generated print job data 1251 to the first multifunction machine. The first multifunction machine receives a plurality of pieces of print job data 1251 from the terminal device 2, stores a plurality of pieces of received print job data 1251, and performs printing based on the print job data 1251 having the data format supported by first multifunction machine itself when the first multifunction machine itself receives a print instruction from the user P. The second multifunction machine receives print job data 1251 having a data format supported by the second multifunction machine itself from the first multifunction machine when the second multifunction machine itself receives a print instruction from the user P, and performs printing based on the received print job data 1251.

Further, in the printing method performed by the plurality of multifunction machines 1 and the terminal device 2, the second multifunction machine transmits the data format of the print job data 1251 supported by the second multifunction machine itself to the first multifunction machine, the first multifunction machine generates a data format list 123 including the received data format supported by the second multifunction machine and a data format supported by the first multifunction machine itself, and transmits the generated data format list 123 to the terminal device 2. Also, in the printing method, the terminal device 2 determine a plurality of data formats of the print job data 1251 to be generated based on the received data format list 123, generates the print job data 1251 for each of the determined data formats, and transmits the plurality of pieces of generated print job data 1251 to the first multifunction machine. Also, in the printing method, the first multifunction machine receives a plurality of pieces of print job data 1251 from the terminal device 2, stores a plurality of pieces of received print job data 1251, and performs printing based on the print job data 1251 having the data format supported by first multifunction machine itself when the first multifunction machine itself receives a print instruction from the user P. Also, in the printing method, the second multifunction machine receives print job data 1251 having a data format supported by the second multifunction machine itself from the first multifunction machine when the second multifunction machine itself receives a print instruction from the user P, and performs printing based on the received print job data 1251.

Further, the first multifunction machine includes the multifunction machine communication unit 11, the multifunction machine storage unit 120, and the multifunction machine controller 10. The multifunction machine controller 10 receives the data format of the print job data 1251 supported by the second multifunction machine from the second multifunction machine through the multifunction machine communication unit 11. The multifunction machine controller 10 generates the data format list 123 including the received data format supported by the second multifunction machine and a data format supported by the first multifunction machine to transmit the generated data format list 123 to the terminal device 2 through the multifunction machine communication unit 11. The multifunction machine controller 10 receives a plurality of pieces of print job data 1251 generated based on the data format list 123 from the terminal device 2 through the multifunction machine communication unit 11 to store the plurality of received print job data 1251 in the multifunction machine storage unit 120. When the multifunction machine controller 10 itself receives a print instruction from the user P, the multifunction machine controller 10 performs printing based on the print job data 1251 having the data format supported by the multifunction machine controller 10 itself, and when the second multifunction machine receives a print instruction from user P, the multifunction machine controller 10 transmits the print job data 1251 having the data format supported by the second multifunction machine to the second multifunction machine.

The terminal device 2 includes the terminal communication unit 21 that communicates with the first multifunction machine and the second multifunction machine, and the terminal controller 20. The terminal controller 20 receives the data format list 123 including the data format of the print job data 1251 supported by the first multifunction machine and the data format supported by the second multifunction machine from the first multifunction machine through the terminal communication unit 21. The terminal controller 20 determine a plurality of data formats of the print job data 1251 to be generated based on the received data format list 123, generates the print job data 1251 for each of the determined data formats, and transmits the plurality of pieces of generated print job data 1251 to the first multifunction machine through the terminal communication unit 21.

According to the printing system 1000, the printing method, the first multifunction machine, and the terminal device 2, when any of the first multifunction machine and the second multifunction machine receive a print instruction from the user P, any of the first multifunction machine and the second multifunction machine can perform printing based on print job data 1251 having the data format supported by them. Therefore, even when the supported data formats of the print job data 1251 are different between the plurality of multifunction machines 1, the user P can perform printing with any multifunction machine 1.

The first multifunction machine and the second multifunction machine can at least either have the RIP software installed or be coupled to the RIP device 3. The data format supported by the first multifunction machine and the data format supported by the second multifunction machine include at least any one data format of the installed RIP software and the coupled RIP device 3.

According to this configuration, the multifunction machine 1 can perform printing based on the print job data 1251 having the data format supported by the installed RIP software and/or the coupled RIP device 3. Therefore, even when the data format supported by the multifunction machine 1 changes due to the install of the RIP software and/or the coupling of the RIP device 3, the user P can perform printing with any multifunction machine 1.

The second multifunction machine transmits the data format supported by second multifunction machine itself to the first multifunction machine at least any one of when activated, when the RIP software is installed, and when the RIP device 3 is coupled. The first multifunction machine generates the data format list 123 including the received data format supported by the second multifunction machine and a data format supported by first multifunction machine itself.

According to this configuration, since the data format list 123 generated by the first multifunction machine can be updated with information that is as accurate as possible, even when the data format supported by the multifunction machine 1 changes due to the install of RIP software and/or the coupling of the RIP device 3, the user P can perform printing more reliably with any multifunction machine 1.

The print job data 1251 includes the user ID 1252. When the first multifunction machine receives a print instruction from user P after the user authentication succeeds, the first multifunction machine performs printing based on the print job data 1251 that includes the user ID 1252 of the user P who has succeeded in the user authentication, and that has a data format supported by the first multifunction machine itself. When the second multifunction machine receives a print instruction from user P after the user authentication succeeds, the second multifunction machine receives, from the first multifunction machine, the print job data 1251 that includes the user ID 1252 of the user P who has succeeded in the user authentication, and that has a data format supported by the second multifunction machine itself.

According to this configuration, since the first multifunction machine and the second multifunction machine can perform printing based on the print job data 1251 of the user P who has succeeded in the user authentication, it is possible to prevent an event in which the user P performs printing based on the print job data 1251 of a person other than the user P from occurring. Therefore, the security for the print job data 1251 can be improved.

The terminal device 2 selects the data formats from the data format list 123 so that at least one data format of the data formats supported by the first multifunction machine and at least one data format of the data formats supported by the second multifunction machine are included, and the selected number of the data formats is equal to or less than the number of the plurality of multifunction machines 1 of the printing system 1000. Then, the terminal device 2 determines the selected data formats as the data format of the print job data 1251 to be generated.

According to this configuration, the print job data 1251 generated by the terminal device 2 can work with the data formats of all the multifunction machines 1 included in the printing system 1000, and the number of print job data 1251 having different data formats can be prevented from being unnecessarily large. Therefore, it is possible to reduce the amount of communication in the printing system 1000 and the storage capacity required for the first multifunction machine to store the print job data 1251 while allowing the user P to perform printing with any multifunction machine 1.

The terminal device 2 selects, when a first support multifunction machine that supports only the combination data format is present among the plurality of multifunction machines 1, the any one data format included in the combination data format. The terminal device 2 does not select, when a second support multifunction machine that supports the combination data format and the data format other than the combination data format is present among the plurality of multifunction machines 1, the data format, other than the combination data format, of the data formats supported by the second support multifunction machine.

According to this configuration, the print job data 1251 generated by the terminal device 2 can work with the data formats of all the multifunction machines 1 included in the printing system 1000 compatible, and the number of pieces of the print job data 1251 having different data formats can be surely reduced to the number of the multifunction machines 1 included in the printing system 1000 or less. Therefore, it is possible to more reliably reduce the amount of communication in the printing system 1000 and the storage capacity required for the first multifunction machine to store the print job data 1251 while allowing the user P to perform printing with any multifunction machine 1.

When the first support multifunction machine that supports only one data format is present among the plurality of multifunction machines 1, the terminal device 2 selects the one data format. When a second support multifunction machine that supports the one data format and a data format other than the one data format is present among a plurality of multifunction machines 1 the terminal device 2 does not select the data format, other than the one data format, of the data formats supported by the first support multifunction machine.

According to this configuration, the print job data 1251 generated by the terminal device 2 can work with the data formats of all the multifunction machines 1 included in the printing system 1000 compatible, and the number of pieces of the print job data 1251 having different data formats can be surely reduced to the number of the multifunction machines 1 included in the printing system 1000 or less. Therefore, it is possible to more reliably reduce the amount of communication in the printing system 1000 and the storage capacity required for the first multifunction machine to store the print job data 1251 while allowing the user P to perform printing with any multifunction machine 1.

When a multifunction machine 1 supported by the data format same as the data format supported by another multifunction machine 1 is present among the plurality of multifunction machines 1, the terminal device 2 selects only the data format same as the data format supported by the another multifunction machine 1 of the data formats supported by the multifunction machine 1.

According to this configuration, the print job data 1251 generated by the terminal device 2 can work with the data formats of all the multifunction machines 1 included in the printing system 1000 compatible, and the number of pieces of the print job data 1251 having different data formats can be surely reduced to the number of the multifunction machines 1 included in the printing system 1000 or less. Therefore, it is possible to more reliably reduce the amount of communication in the printing system 1000 and the storage capacity required for the first multifunction machine to store the print job data 1251 while allowing the user P to perform printing with any multifunction machine 1.

Second Embodiment

Next, the second embodiment will be described. In the description of the second embodiment, the same components as the components of the multifunction machine 1 and the terminal device 2 of the first embodiment are denoted by the same reference numerals, and detailed description thereof will be appropriately omitted.

The second embodiment is different from the first embodiment in the contents of the data format list 123 stored in each multifunction machine 1. The data format list 123 of the first embodiment is a list showing all the data formats supported by the multifunction machine 1 for each multifunction machine 1. The data format list 123 of the second embodiment is a list showing all the data formats that are configured to be processed by the multifunction machine 1 at a predetermined processing speed or higher for each multifunction machine 1. This data format is predetermined for each multifunction machine 1.

The driver execution unit 212 of the second embodiment refers to the data format list 123 to perform the operation of the data format determination process shown in FIG. 6.

Figure 9:
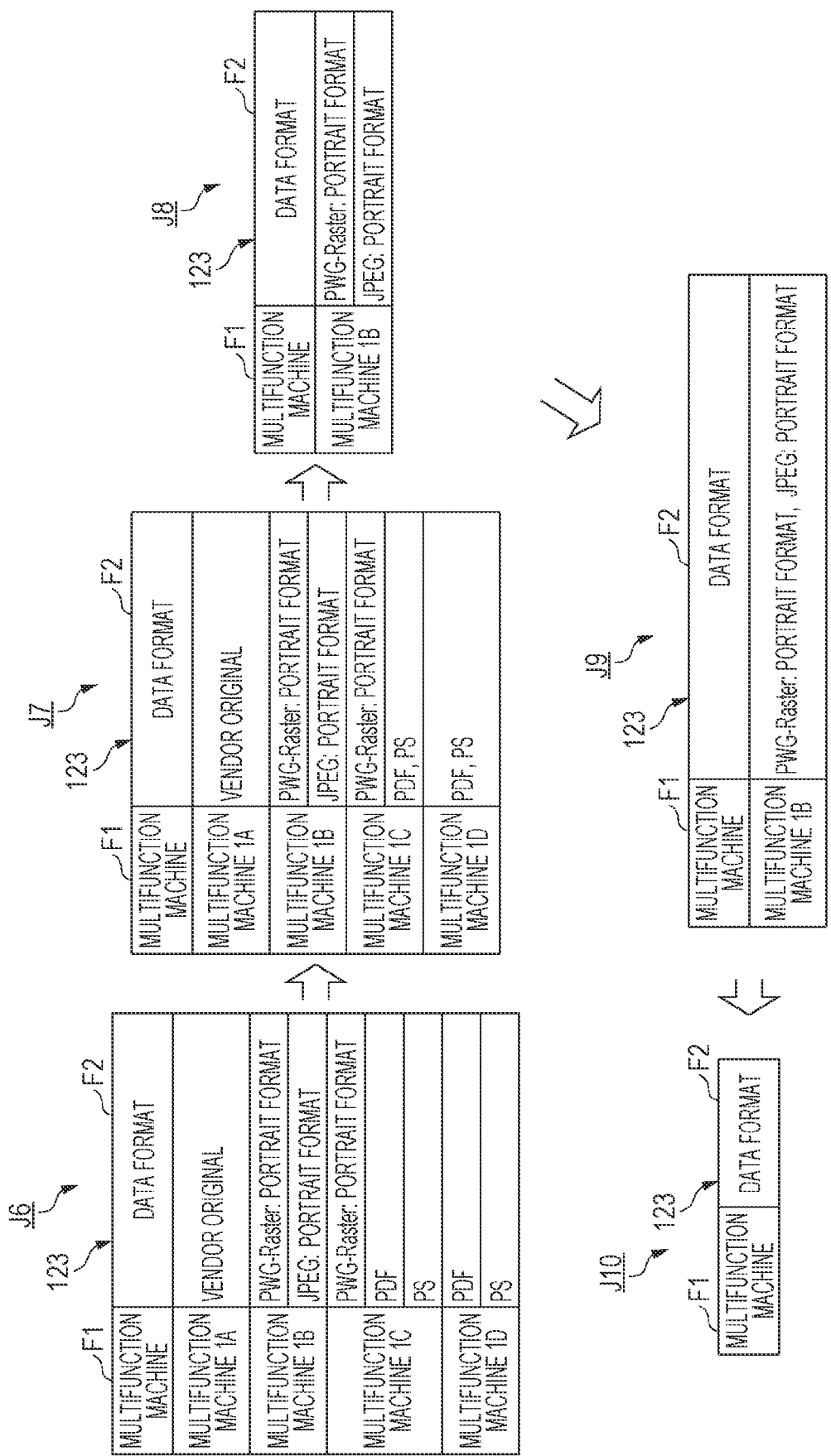
FIG. 9 is a diagram for specifically explaining a data format determination process.

Here, the second embodiment will be specifically described with reference to FIG. 9. FIG. 9 is a diagram for specifically explaining the data format determination process in the second embodiment.

In FIG. 9, a state J6 shows the state of the data format list 123 when the terminal device 2 receives it in step SC4. The data format list 123 in the state J6 of FIG. 9 is a list showing all the data formats, of the print job data 1251, that are configured to be processed at a predetermined processing speed or higher for each multifunction machine 1.

The driver execution unit 212 consolidates data formats as a combination data format with respect to the data format list 123 in the state J6. In FIG. 9, the combination of the PDF and the PS is the combination data format. The driver execution unit 212 changes the state of the data format list 123 from the state J6 to a state J7 by consolidating the PDF and the PS as a combination data format with respect to the data format list 123 in the state J6.

As is clear from the data format list 123 in the state J7, the multifunction machine 1D supports only the combination data format of the PDF and the PS. Therefore, the driver execution unit 212 selects any one data format of the PDF and the PS from the data format list 123.

Further, as is clear from the data format list 123 in the state J7, the multifunction machine 1A supports only the vendor original. Therefore, the driver execution unit 212 selects the vendor original from the data format list 123.

Hereinafter, in the description of FIG. 9, it is assumed that the driver execution unit 212 selects the PDF and the vendor original.

As is clear from the data format list 123 in the state J7, the multifunction machine 1C supports the PWG-Raster in portrait format in addition to the combination data format of the PDF and the PS. Therefore, the driver execution unit 212 removes the data format supported by the multifunction machines 1A, 1C, and 1D from the data format list 123 in step SC54 of FIG. 6, and changes the state of the data format list 123 from the state J7 to a state J8.

As is clear from the data format list 123 in the state J8, the data format list 123 in the state J8 includes a list of data formats supported by the multifunction machine 1B. Therefore, the driver execution unit 212 makes an affirmative determination in step SC58, and again performs the process of step SC51 with respect to the data format list 123 in the state J8.

The driver execution unit 212 consolidates data formats as a combination data format with respect to the data format list 123 in the state J8. In FIG. 9, the combination of the PWG-Raster in portrait format and the JPEG in portrait format is the combination data format. The driver execution unit 212 changes the state of the data format list 123 from the state J8 to a state J9 by consolidating the PWG-Raster in portrait format and the JPEG in portrait format as a combination data format with respect to the data format list 123 in the state J8.

As is clear from the data format list 123 in the state J9, in the data format list 123 in the state J9, the multifunction machine 1B supports only the combination data format of the PWG-Raster in portrait format and the JPEG in portrait format. Therefore, the driver execution unit 212 selects any one data format of the PWG-Raster in portrait format and the JPEG in portrait format from the data format list 123. Hereinafter, in the description of FIG. 9, it is assumed that the driver execution unit 212 selects the PWG-Raster in portrait format.

When the PWG-Raster in portrait format is selected in the data format list 123 in the state J9, the driver execution unit 212 removes the data format supported by the multifunction machine 1B in step SC57 of FIG. 6, and changes the state of the data format list 123 from the state J9 to a state J10.

As is clear from the data format list 123 in the state J10, the data format list 123 in the state J10 does not include a list of the data formats of any of the multifunction machines 1. Therefore, the driver execution unit 212 makes a negative determination in step SC58, and determines the selected vendor original, the selected PDF, and the selected PWG-Raster in portrait format as the data formats of the print job data 1251 to be generated.

According to the second embodiment described above, the same effect as that of the first embodiment is obtained.

Further, the data format list 123 of the second embodiment is a list of data formats that are configured to be processed by each of the plurality of multifunction machines 1 at a predetermined processing speed or higher.

According to this configuration even when the supported data formats of the print job data 1251 are different between a plurality of multifunction machines 1, the user P can perform printing with any multifunction machine 1, and it is possible to prevent a printing speed of any multifunction machine 1 from decreasing.

Third Embodiment

Next, the third embodiment will be described. In the description of the third embodiment, the same components as the components of the multifunction machine 1 and the terminal device 2 of the first embodiment and the second embodiment are denoted by the same reference numerals and detailed description thereof will be appropriately omitted.

The third embodiment is different from the first embodiment and the second embodiment in the data format list 123 stored in each multifunction machine 1. Further, the third embodiment is different from the first embodiment and the second embodiment in that the terminal device 2 performs a preprocess on the data format list 123 before the data format determination process.

FIG. 10 is a diagram showing an example of the data format list 123 of the third embodiment. One record in the data format list 123 according to the third embodiment has the multifunction machine field F1, a priority field F3, and the data format field F2.

The priority field F3 stores information indicating the rank of data formats that are configured to be processed at high speed in the data formats supported by the multifunction machine 1. In the present embodiment, the smaller the value of the rank, at the higher speed the data format that the multifunction machine 1 can process.

In FIG. 10, the record R1 shows a record R related to the multifunction machine 1A. The priority field F3 of the record R1 stores information indicating that the vendor original has the first rank, and stores information indicating that the PWG-Raster in portrait format and the JPEG in portrait format have the second rank in a tie.

In FIG. 10, the record R2 shows a record R related to the multifunction machine 1B. The priority field F3 of the record R2 stores information indicating that the PWG-Raster in portrait format and the JPEG in portrait format have the first rank in a tie, and stores information indicating that the PWG-Raster in landscape format has the second rank.

In FIG. 10, the record R3 shows a record R related to the multifunction machine 1C. The priority field F3 of the record R3 stores information indicating that the PWG-Raster in portrait format has the first rank, stores information indicating that the PWG-Raster in landscape format has the second rank, and stores information indicating that the PDF and the PS have the third rank in a tie.

In FIG. 10, the record R4 shows a record R related to the multifunction machine 1D. The priority field F3 of the record R4 stores information indicating that the PDF and the PS have the first rank in a tie.

The driver execution unit 212 of the third embodiment performs a preprocess on the data format list 123 received from the multifunction machine 1 before performing the data format determination process shown in FIG. 6.

FIG. 11 is a diagram for explaining the preprocess.

In FIG. 11, a state J11 shows the state of the data format list 123 when the terminal device receives the data format list 123 from the multifunction machine 1. The data format list 123 in the state J11 shown in FIG. 11 illustrates the data format list 123 shown in FIG. 10.

In the preprocess, the driver execution unit 212 removes a list of data formats that the printer driver 223 does not support with respect to the data format list 123 in the state J11. In the example of FIG. 11, it is assumed that the printer driver 223 does not support the vendor original. Therefore, the driver execution unit 212 removes the vendor original data format from the data format list 123 in the state J11, and changes the state of the data format list 123 from the state J11 to a state J12.

Next, the driver execution unit 212 removes, from the data format list 123 from which the list of data formats that the printer driver 223 does not support is removed, a data format other than the data format with the highest priority for each multifunction machine 1. As a result, the driver execution unit 212 changes the state of the data format list 123 from the state J12 to a state J13.

With this, the driver execution unit 212 ends the preprocess.

The driver execution unit 212 of the third embodiment performs the data format determination process shown in FIG. 6 on the data format list 123 whose state has been changed by performing the preprocess.

According to the third embodiment described above, the same effects as those of the first embodiment and the second embodiment are obtained.

Further, in the third embodiment, the driver execution unit 212 removes a data format that is not supported by the printer driver 223 from the data format list 123, and removes a data format other than the data format with the highest priority. As a result, in the data format determination process the driver execution unit 212 can determine a data format, of the print job data 1251, that can be reliably generated, and that makes it possible to prevent a printing speed of the multifunction machine 1 from decreasing. Therefore, according to the third embodiment, even when the supported data formats of the print job data 1251 are different between a plurality of multifunction machines 1, the user P can reliably perform printing with any multifunction machine 1, and it is possible to prevent a printing speed of any multifunction machine 1 from decreasing.

Each of the above-described embodiments shows only an aspect of the present disclosure, and any modification and application can be made within the scope of the present disclosure.

For example, in each of the above-described embodiments, the serial ink jet method is exemplified as the printing method of the multifunction machine 1, but the printing method of the multifunction machine 1 may be the line ink jet method. Further, the printing method of the multifunction machine 1 is not limited to the ink jet method, but another printing method may be used. Further, although the multifunction machine 1 has been illustrated as the printing apparatus, the printing apparatus is not limited to the multifunction machine 1, but a printing apparatus such as a printer having no scan function may be used. Further, the multifunction machine 1 may be a device having various functions such as a facsimile function.

Further, the functions of the multifunction machine controller 10 and the terminal controller 20 may be implemented by a plurality of processors or semiconductor chips.

Further, respective units shown in FIGS. 2A and 2B are an example, and a specific mounting form is not limited in particular. That is, it is not necessarily required to implement hardware corresponding to respective units, but it is of course possible to construct a configuration in which the functions of the respective units are implemented by executing a program by one processor. In addition, in the above embodiments, part of the functions implemented by software may be implemented by hardware, or part of the functions implemented by hardware may be implemented by software. In addition, specific detailed configurations of other parts of the multifunction machine 1 and the terminal device 2 can be changed in any manner without departing from the scope of the present disclosure.

Further, for example, the step units of the operations shown in FIGS. 4, 5, 6, and 8 are divided in accordance with the main processing contents in order to facilitate understanding of the operations of the respective devices of the printing system 1000. The present disclosure is not limited by the method and name of the division of the processing stage. Depending on the processing contents, the process may be divided into more step units. Further, one step unit may be divided so as to include more processes. In addition, the order of the steps may be changed as appropriate within the scope of the present disclosure.

What is claimed is:

1. A printing system comprising:
   a first printing apparatus;
   a second printing apparatus; and
   a terminal device configured to communicate with the first printing apparatus, wherein the second printing apparatus transmits a data format, of print job data, that is supported by the second printing apparatus itself to the first printing apparatus, wherein
   the first printing apparatus
   generates a data format list including the received data format supported by the second printing apparatus and a data format, of a print job data, that is supported by the first printing apparatus itself, and
   transmits the generated data format list to the terminal device, wherein the terminal device
determines a plurality of the data formats of the print job data to be generated based on the received data format list to generate the print job data for each of the plurality of determined data formats to transmit the plurality of generated print job data to the first printing apparatus, wherein the first printing apparatus
receives the plurality of print job data from the terminal device to store the plurality of received print job data to perform printing based on the print job data having the data format supported by the first printing apparatus when the first printing apparatus receives a print instruction from a user, and wherein the second printing apparatus
receives the print job data having the data format supported by the second printing apparatus from the first printing apparatus to perform printing based on the received print job data when the second printing apparatus receives a print instruction from a user, wherein the terminal device, when determining the selected data formats as the data format for the print job data to be generated, selects the data formats from the data format list so that at least one data format of the data formats supported by the first printing apparatus and at least one data format of the data formats supported by the second printing apparatus are included, and the selected number of the data formats is equal to or less than the number of the plurality of printing apparatuses of the printing system, wherein the terminal device further
consolidates at least two of the selected data formats that are supported by both the first and second printing apparatuses into a combination data format, the combination data format being included in data format list, selects, when a printing apparatus is present among the plurality of printing apparatuses that supports only the at least two data formats comprising the combination data format, one of the two data formats in the combination data format and removes the unselected data format from the data format list, does not select, when a printing apparatus that supports the combination data format and a data format that is not included in the combination data format is present among the plurality of printing apparatuses, the data format not included in the combination data format.

2. The printing system according to claim 1, wherein
the first printing apparatus and the second printing apparatus are configured to at least either have image processing software installed or be coupled to the image processing device, and wherein the data format supported by the first printing apparatus and the data format supported by the second printing apparatus include the data format which at least one of the installed image processing software and the coupled image processing device is configured to process.

3. The printing system according to claim 2, wherein
the second printing apparatus
transmits the data format supported by the second printing apparatus to the first printing apparatus at least one of when activated, when the image processing software is installed, and when the image processing device is coupled, and wherein the first printing apparatus
generates the data format list including the received data format supported by the second printing apparatus and the data format supported by the first printing apparatus.

4. The printing system according to claim 1, wherein
the print job data includes user information related to a user, wherein the first printing apparatus
performs, when receiving a print instruction from a user after user authentication succeeds, printing based on the print job data that includes the user information of the user who succeeded in the user authentication, and that has the data format supported by the first printing apparatus, and wherein the second printing apparatus receives, from the first printing apparatus, when receiving a print instruction from a user after user authentication succeeds, the print job data that includes the user information of the user who succeeded in the user authentication, and that has the data format supported by the second printing apparatus.

5. The printing system according to claim 1, wherein
the terminal device
selects, when a printing apparatus that supports only one data format of the data formats is present among the plurality of printing apparatuses, the one data format of the data formats, and does not select, when a printing apparatus that supports the one data format of the data formats and the data format other than the one data format of the data formats is present among the plurality of printing apparatuses, the data format, other than the one data format of the data formats, of the data formats supported by the printing apparatus.

6. The printing system according to claim 1, wherein
the terminal device
selects, when a printing apparatus that supports the same data format as the data format supported by another printing apparatus is present among the plurality of printing apparatuses, only the data format same as the data format supported by the another printing apparatus of the data formats supported by the printing apparatus.

7. The printing system according to claim 1, wherein
the data format list is a list of the data formats that are configured to be processed by each of the plurality of printing apparatuses at a predetermined processing speed or higher.

8. A printing system comprising:
a printing apparatus; and
a terminal device;
the printing apparatus comprising:
a printing apparatus communication unit configured to communicate with a terminal device and another printing apparatus; a storage unit; and a printing apparatus controller, wherein the printing apparatus controller:
receives a data format of print job data supported by the another printing apparatus through the printing apparatus communication unit from the another printing apparatus, generates a data format list including the received data format supported by the another printing apparatus and a data format, of a print job data, that is supported by the printing apparatus, transmits the generated data format list to the terminal device through the printing apparatus communication unit, receives a plurality of pieces of the print job data generated based on the data format list from the terminal device through the printing apparatus communication unit, stores the plurality of pieces of received print job data in the storage unit, performs printing based on the print job data having the data format supported by the printing apparatus when the printing apparatus receives a print instruction from a user, and transmits the print job data having the data format supported by the another printing apparatus to the another printing apparatus when the another printing apparatus receives a print instruction from a user, the terminal device comprising:

a terminal communication unit that communicates with a first printing apparatus that stores received print job data and a second printing apparatus that is configured to receive the print job data stored by the first printing apparatus from the first printing apparatus; and a terminal controller, wherein the terminal controller:

receives a data format list including a data format, of the print job data, supported by the first printing apparatus and a data format, of a print job data, supported by the second printing apparatus through the terminal communication unit from the first printing apparatus, and determines a plurality of the data formats of the print job data to be generated based on the received data format list to generate the print job data for each of the plurality of determined data formats to transmit the plurality of generated print job data to the first printing apparatus through the terminal communication unit, wherein the terminal controller, when determining the selected data formats as the data format for the print job data to be generated:

selects the data formats from the data format list so that at least one data format of the data formats supported by the first printing apparatus and at least one data format of the data formats supported by the second printing apparatus are included, consolidates at least two of the selected data formats that are supported by both the first and second printing apparatuses into a combination data format, the combination data format being included in data format list, selects, when the first printing apparatus supports only the at least two data formats comprising the combination data format, one of the two data formats in the combination data format as the data format for the first printing device and removes the unselected data format from the data format list, selects for the second printing apparatus a data format that is not included in the combination data format.

9. A terminal device comprising:

a terminal communication unit that communicates with a first printing apparatus that stores received print job data and a second printing apparatus that is configured to receive the print job data stored by the first printing apparatus from the first printing apparatus; and a terminal controller, wherein the terminal controller:

receives a data format list including a data format, of the print job data, supported by the first printing apparatus and a data format, of a print job data, supported by the second printing apparatus through the terminal communication unit from the first printing apparatus, and determines a plurality of the data formats of the print job data to be generated based on the received data format list to generate the print job data for each of the plurality of determined data formats to transmit the plurality of generated print job data to the first printing apparatus through the terminal communication unit, wherein the terminal controller, when determining the selected data formats as the data format for the print job data to be generated:

selects the data formats from the data format list so that at least one data format of the data formats supported by the first printing apparatus and at least one data format of the data formats supported by the second printing apparatus are included, consolidates at least two of the selected data formats that are supported by both the first and second printing apparatuses into a combination data format, the combination data format being included in data format list, selects, when the first printing apparatus supports only the at least two data formats comprising the combination data format, one of the two data formats in the combination data format as the data format for the first printing device and removes the unselected data format from the data format list, selects for the second printing apparatus a data format that is not included in the combination data format.

* * * * *